US010730699B2

(12) United States Patent
Sweet et al.

(10) Patent No.: US 10,730,699 B2
(45) Date of Patent: Aug. 4, 2020

(54) MULTIPOSITION LIFT

(71) Applicant: Symbotic, LLC, Wilmington, MA (US)

(72) Inventors: Larry Sweet, Wenham, MA (US); Kil Kwak, Cambridge, MA (US); Kirill Pankratov, Acton, MA (US); Russell G. Barbour, Natick, MA (US); William Johnson, Andover, MA (US); Juergen D. Conrad, York, PA (US); Juergen Baumbach, Hampton, VA (US); Ronald Kyslinger, York, PA (US)

(73) Assignee: Symbotic LLC, Wilmington, MA (US)

( * ) Notice: Subject to any disclaimer, the term of this patent is extended or adjusted under 35 U.S.C. 154(b) by 0 days.

(21) Appl. No.: 16/051,158

(22) Filed: Jul. 31, 2018

(65) Prior Publication Data

US 2018/0334326 A1    Nov. 22, 2018

Related U.S. Application Data

(63) Continuation of application No. 15/339,548, filed on Oct. 31, 2016, now Pat. No. 10,035,650, which is a
(Continued)

(51) Int. Cl.
*B65G 1/137* (2006.01)
*B65G 1/04* (2006.01)
*G06Q 10/08* (2012.01)

(52) U.S. Cl.
CPC .......... *B65G 1/137* (2013.01); *B65G 1/0485* (2013.01); *B65G 1/0492* (2013.01); *G06Q 10/08* (2013.01)

(58) Field of Classification Search
CPC combination set(s) only.
See application file for complete search history.

(56) References Cited

U.S. PATENT DOCUMENTS

| 1,887,667 A | 11/1932 | Wheeler |
| 2,945,604 A | 7/1960 | Kroll et al. |
| (Continued) | | |

FOREIGN PATENT DOCUMENTS

| CA | 1252430 | 4/1998 |
| DE | 2150500 | 4/1973 |
| (Continued) | | |

OTHER PUBLICATIONS

International Search Report, International Application No. PCT/US2014/030213, dated Jul. 22, 2014.
(Continued)

*Primary Examiner* — Kyle O Logan
(74) *Attorney, Agent, or Firm* — Perman & Green, LLP

(57) ABSTRACT

An automated storage and retrieval system includes a first independently operable section having a first number of predetermined storage and retrieval transactions, and a second independently operable section in communication with the first independently operable section and having a second number of predetermined storage and retrieval transactions. The first and second independently operable sections are configured to provide a respective number of predetermined storage and retrieval transactions so that the first number of predetermined storage and retrieval transactions substantially matches the second number of predetermined storage and retrieval transactions.

20 Claims, 17 Drawing Sheets

Related U.S. Application Data continuation of application No. 14/215,289, filed on Mar. 17, 2014, now Pat. No. 9,481,517.

(60) Provisional application No. 61/791,251, filed on Mar. 15, 2013.

(56) References Cited

U.S. PATENT DOCUMENTS

| | | | |
|---|---|---|---|
| 3,016,154 A | 1/1962 | Giorgio et al. | |
| 3,161,303 A | 12/1964 | Burrows | |
| 3,554,390 A | 1/1971 | Saul | |
| 3,581,915 A | 6/1971 | Saul | |
| 3,738,506 A | 6/1973 | Cornford et al. | |
| 4,064,986 A | 12/1977 | Bertovich | |
| 4,307,988 A | 12/1981 | Page et al. | |
| 4,394,104 A | 7/1983 | Camerini et al. | |
| 4,428,708 A | 1/1984 | Burt | |
| 4,492,504 A | 1/1985 | Hainsworth | |
| 4,678,390 A | 7/1987 | Bonneton et al. | |
| 4,692,876 A * | 9/1987 | Tenma | B65G 1/1371 414/791.6 |
| 4,777,416 A | 10/1988 | George, II et al. | |
| 4,856,263 A | 8/1989 | Schneider et al. | |
| 4,883,401 A | 11/1989 | Kavieff | |
| 4,909,697 A | 3/1990 | Bernard, II et al. | |
| 4,987,992 A | 1/1991 | Pfleger | |
| 5,101,963 A | 4/1992 | Skarlupka et al. | |
| 5,220,263 A | 6/1993 | Onishi et al. | |
| 5,273,392 A | 12/1993 | Bernard, II et al. | |
| 5,323,098 A | 6/1994 | Hamaguchi et al. | |
| 5,337,880 A | 8/1994 | Claycomb et al. | |
| 5,350,270 A | 9/1994 | Stallard et al. | |
| 5,370,492 A | 12/1994 | Gleyze et al. | |
| 5,395,206 A | 3/1995 | Cerny, Jr. | |
| 5,509,538 A | 4/1996 | Spindler et al. | |
| 5,611,422 A | 3/1997 | Harkonen | |
| 5,615,992 A | 4/1997 | Proske et al. | |
| 5,664,929 A | 9/1997 | Esaki et al. | |
| 5,709,291 A | 1/1998 | Nishino et al. | |
| 5,718,322 A | 2/1998 | Mulhern | |
| 5,801,506 A | 9/1998 | Netzler | |
| 5,908,283 A * | 6/1999 | Huang | B65G 47/90 414/21 |
| 6,061,607 A | 5/2000 | Bradley et al. | |
| 6,149,366 A | 11/2000 | Deandrea | |
| 6,257,826 B1 | 7/2001 | Neagle et al. | |
| 6,289,260 B1 | 9/2001 | Bradley et al. | |
| 6,321,899 B1 | 11/2001 | Hannessen | |
| 6,377,867 B1 | 4/2002 | Bradley et al. | |
| 6,394,260 B1 | 5/2002 | Barth | |
| 6,397,990 B1 | 6/2002 | Brien et al. | |
| 6,496,755 B2 | 12/2002 | Wallach et al. | |
| 6,503,043 B1 | 1/2003 | Smith et al. | |
| 6,764,373 B1 | 7/2004 | Osawa et al. | |
| 6,836,701 B2 | 12/2004 | McKee | |
| 6,859,682 B2 | 2/2005 | Naka et al. | |
| 7,054,716 B2 | 5/2006 | McKee et al. | |
| 7,066,291 B2 | 6/2006 | Martins et al. | |
| 7,101,139 B1 | 9/2006 | Benedict | |
| 7,133,746 B2 | 11/2006 | Abramson et al. | |
| 7,137,593 B2 | 11/2006 | Baatz | |
| 7,278,532 B2 | 10/2007 | Martin | |
| 7,329,081 B2 | 2/2008 | Baker et al. | |
| 7,332,890 B2 | 2/2008 | Cohen et al. | |
| 7,376,487 B2 | 5/2008 | Kumhyr | |
| 7,397,213 B2 | 7/2008 | Im et al. | |
| 7,460,462 B2 | 12/2008 | Mejia et al. | |
| 7,520,376 B2 | 4/2009 | Bar | |
| 7,532,947 B2 | 5/2009 | Waddington et al. | |
| 7,615,957 B2 | 11/2009 | Kim et al. | |
| 7,653,457 B2 | 1/2010 | Bloom | |
| 7,686,560 B2 | 3/2010 | Laurin et al. | |
| 7,695,235 B1 | 4/2010 | Rallis | |
| 7,771,152 B2 | 8/2010 | Waltersbacher | |
| 7,826,919 B2 | 11/2010 | Dandrea et al. | |
| 7,826,920 B2 | 11/2010 | Stevens et al. | |
| 7,856,290 B2 | 12/2010 | Kumhyr | |
| 7,861,844 B2 | 1/2011 | Hayduchok | |
| 7,894,940 B2 | 2/2011 | Kumhyr | |
| 7,931,431 B2 | 4/2011 | Benedict et al. | |
| 7,941,244 B2 | 5/2011 | Somin et al. | |
| 7,963,384 B2 | 6/2011 | Lafontaine | |
| 7,972,102 B2 | 7/2011 | Ward et al. | |
| 7,991,505 B2 | 8/2011 | Lert, Jr. et al. | |
| 8,006,824 B2 | 8/2011 | Wada et al. | |
| 8,024,064 B1 | 9/2011 | Sanghavi et al. | |
| 8,028,822 B2 | 10/2011 | Braunstein | |
| 8,047,756 B2 | 11/2011 | Tuffs et al. | |
| 8,480,347 B2 | 7/2013 | Schafer | |
| 8,770,385 B2 | 7/2014 | Hannessen | |
| 2002/0037208 A1 | 3/2002 | Patrito | |
| 2002/0124389 A1 | 9/2002 | Matson | |
| 2004/0088081 A1 | 5/2004 | Song et al. | |
| 2004/0197171 A1 | 10/2004 | Freudelsperger | |
| 2004/0238326 A1 | 12/2004 | Lichti | |
| 2006/0245862 A1 | 11/2006 | Hansl et al. | |
| 2007/0065258 A1 | 3/2007 | Benedict et al. | |
| 2007/0065259 A1 | 3/2007 | Talley | |
| 2007/0071585 A1 | 3/2007 | Henkel | |
| 2007/0114975 A1 | 5/2007 | Cohen et al. | |
| 2007/0267998 A1 | 11/2007 | Cohen et al. | |
| 2008/0007203 A1 | 1/2008 | Cohen et al. | |
| 2008/0025833 A1 | 1/2008 | Baker et al. | |
| 2008/0044262 A1 * | 2/2008 | Kim | B65G 1/0421 414/273 |
| 2008/0129445 A1 | 6/2008 | Kraimer et al. | |
| 2008/0174268 A1 | 7/2008 | Koo et al. | |
| 2009/0148259 A1 | 6/2009 | Shani | |
| 2009/0265031 A1 | 10/2009 | Tachibana et al. | |
| 2009/0284245 A1 | 11/2009 | Kirby et al. | |
| 2009/0315501 A1 | 12/2009 | Li et al. | |
| 2010/0121481 A1 | 5/2010 | Talley et al. | |
| 2010/0222915 A1 * | 9/2010 | Kuehnemann | B65G 57/00 700/217 |
| 2010/0277005 A1 | 11/2010 | Karalis et al. | |
| 2010/0277121 A1 | 11/2010 | Hall et al. | |
| 2010/0308939 A1 | 12/2010 | Kurs | |
| 2010/0316468 A1 * | 12/2010 | Lert | B65G 47/57 414/273 |
| 2010/0316469 A1 | 12/2010 | Lert | |
| 2010/0316470 A1 | 12/2010 | Lert et al. | |
| 2010/0322746 A1 | 12/2010 | Lert et al. | |
| 2011/0058926 A1 | 3/2011 | Winkler | |
| 2011/0068943 A1 | 3/2011 | Lane, Jr. | |
| 2011/0082583 A1 | 4/2011 | Kumhyr | |
| 2011/0106295 A1 | 5/2011 | Miranda et al. | |
| 2011/0118903 A1 | 5/2011 | Kraimer et al. | |
| 2011/0148364 A1 | 6/2011 | Ota | |
| 2011/0182703 A1 | 7/2011 | Alan | |
| 2011/0216185 A1 | 9/2011 | Laws et al. | |
| 2011/0238206 A1 | 9/2011 | Somin et al. | |
| 2011/0254503 A1 | 10/2011 | Widmer et al. | |
| 2011/0285349 A1 | 11/2011 | Widmer et al. | |
| 2012/0101627 A1 * | 4/2012 | Lert | B65G 1/065 700/216 |
| 2012/0185082 A1 * | 7/2012 | Toebes | B65G 1/0492 700/218 |
| 2012/0186192 A1 * | 7/2012 | Toebes | B65G 1/04 53/235 |
| 2012/0189409 A1 * | 7/2012 | Toebes | B65G 1/0492 414/273 |
| 2012/0189416 A1 | 7/2012 | Toebes | |
| 2012/0195720 A1 * | 8/2012 | Sullivan | B65G 1/04 414/277 |
| 2012/0197431 A1 * | 8/2012 | Toebes | B65G 1/0492 700/217 |
| 2012/0200259 A1 * | 8/2012 | Sullivan | G06Q 30/0215 320/109 |
| 2012/0328397 A1 * | 12/2012 | Yamashita | B65G 1/065 414/282 |
| 2013/0129453 A1 | 5/2013 | Salichs | |
| 2014/0088748 A1 | 3/2014 | Woodtli et al. | |

(56) References Cited

U.S. PATENT DOCUMENTS

| | | | |
|---|---|---|---|
| 2014/0100999 A1* | 4/2014 | Mountz | G06Q 10/087 705/28 |
| 2014/0124462 A1 | 5/2014 | Yamashita | |
| 2014/0277692 A1 | 9/2014 | Buzan et al. | |

FOREIGN PATENT DOCUMENTS

| | | |
|---|---|---|
| DE | 10356563 | 6/2005 |
| EP | 169156 | 1/1986 |
| EP | 995704 | 4/2000 |
| EP | 1193195 | 4/2002 |
| EP | 1818286 | 8/2007 |
| GB | 2407565 | 5/2005 |
| JP | 20111788549 | 9/2011 |
| JP | 2012211019 | 11/2012 |
| WO | 2004103883 | 12/2004 |
| WO | 2009150684 | 12/2009 |
| WO | 2010118412 | 10/2010 |
| WO | 2012156355 | 11/2012 |

OTHER PUBLICATIONS

International Search Report, International Application No. PCT/US2016/013917, dated May 20, 2016.
International Search Report, International Application No. PCT/US2011/065248, dated Mar. 20, 2012.

\* cited by examiner

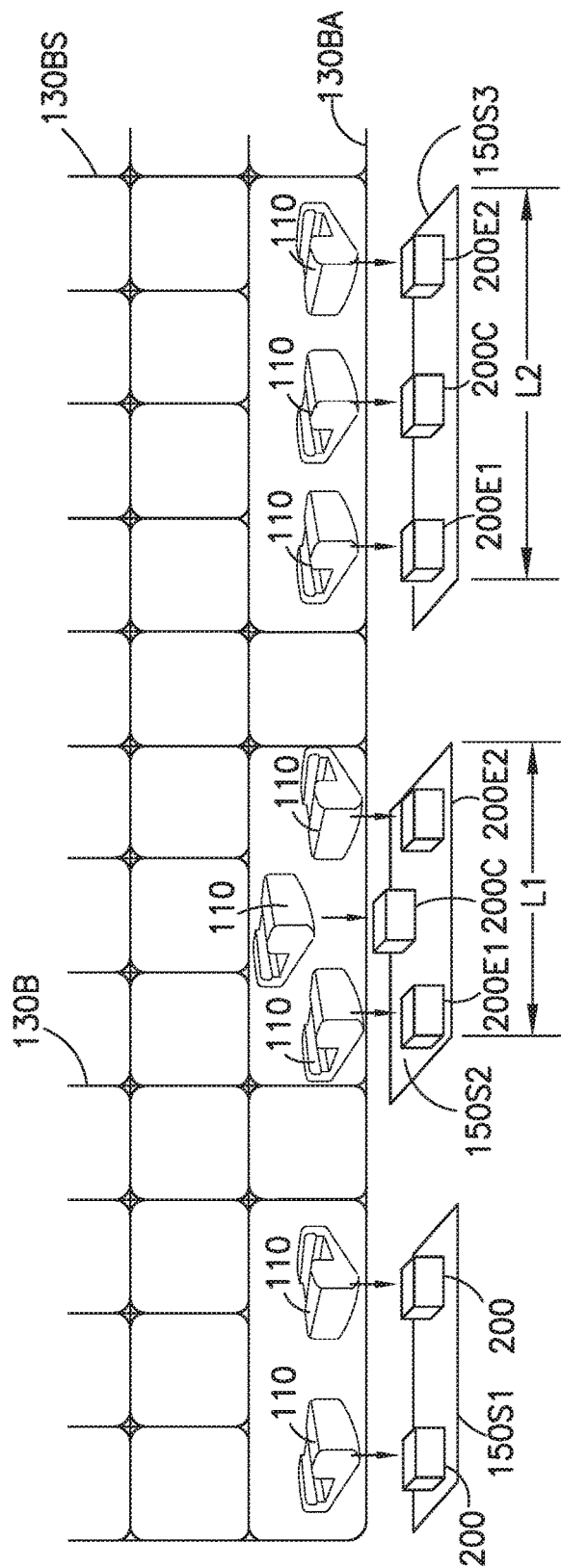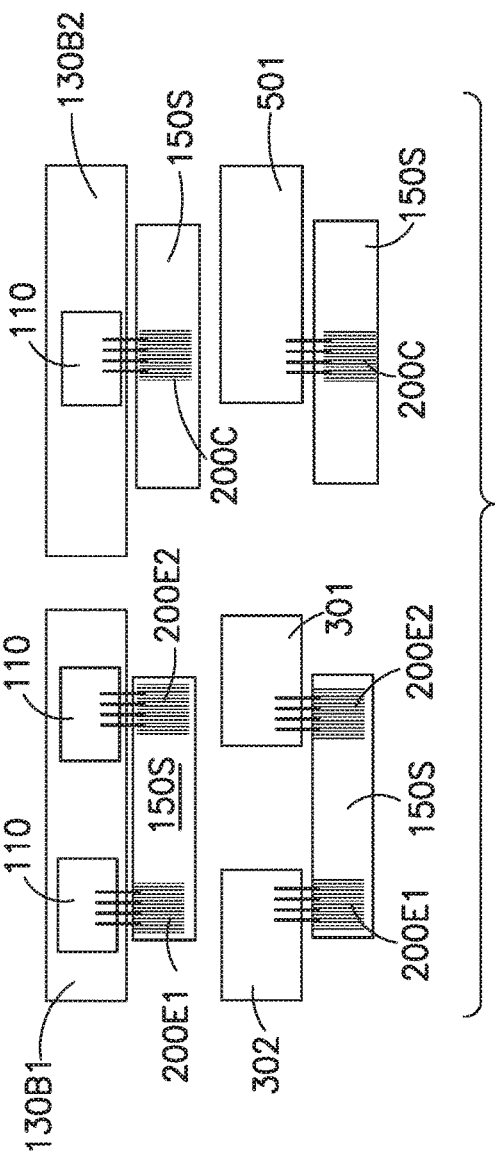

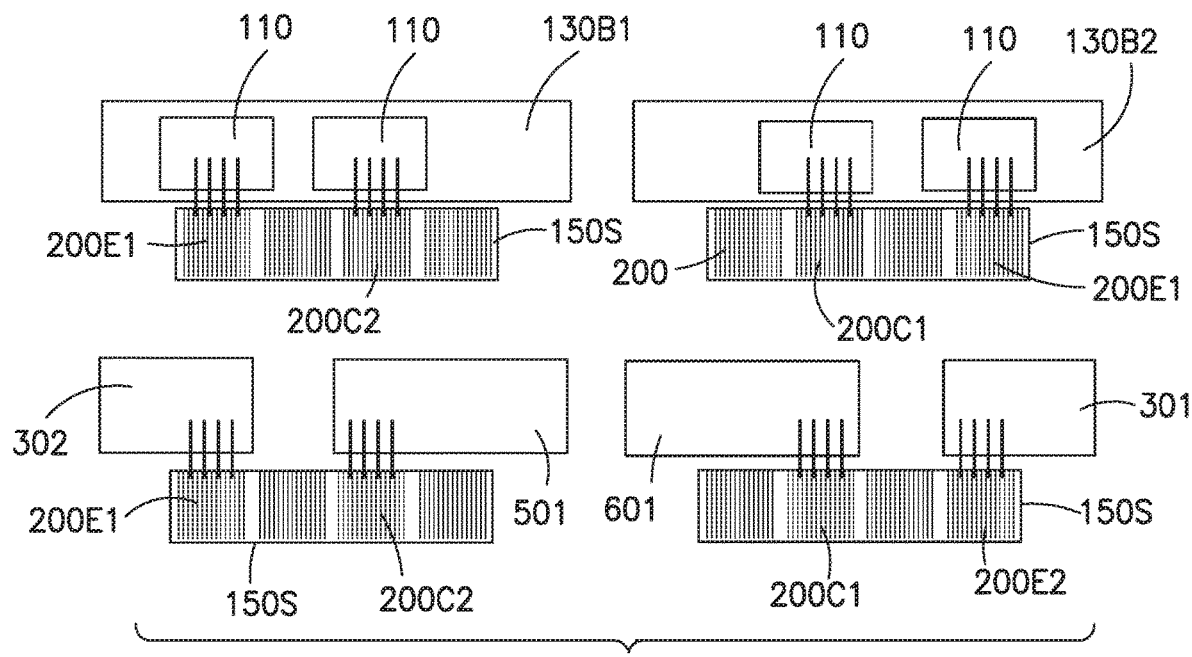
FIG.6
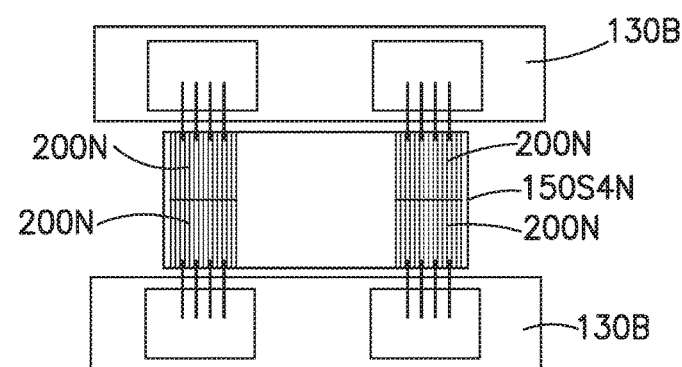
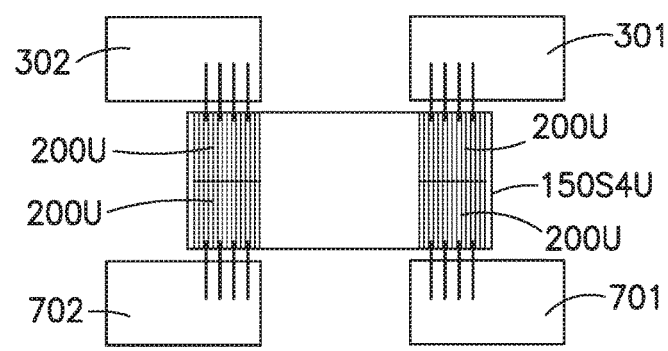
FIG.7A

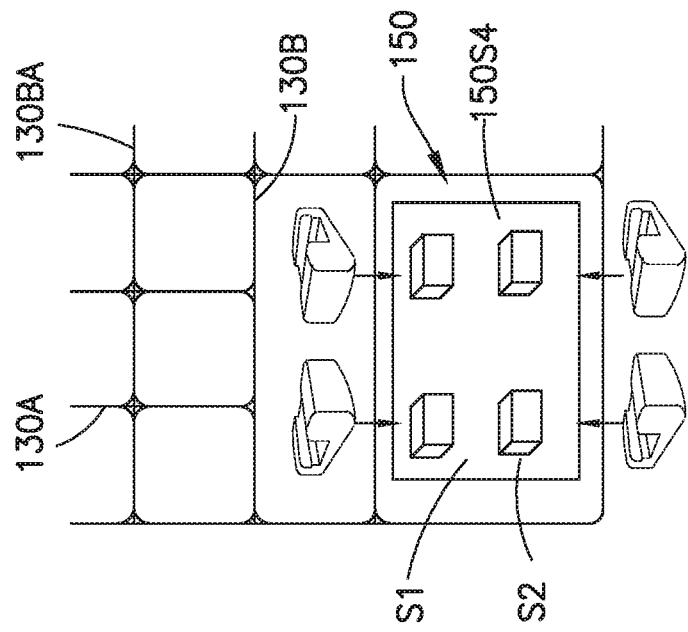
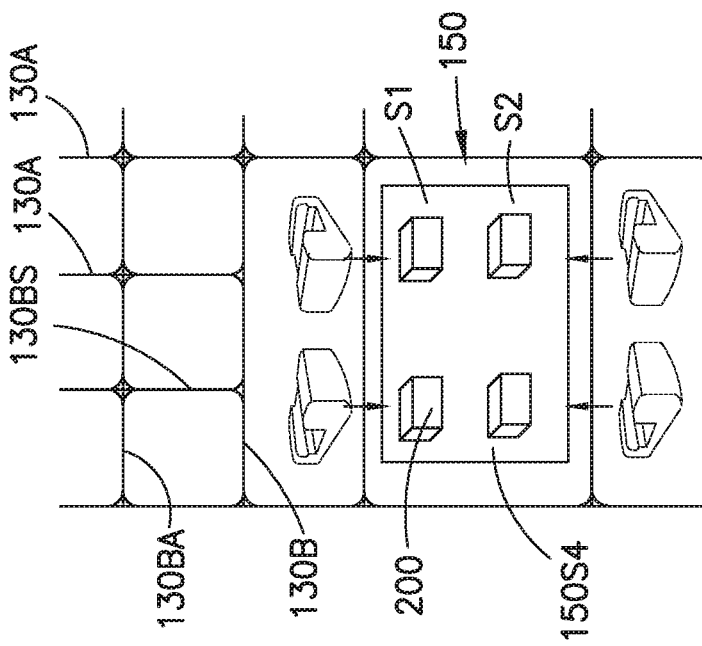

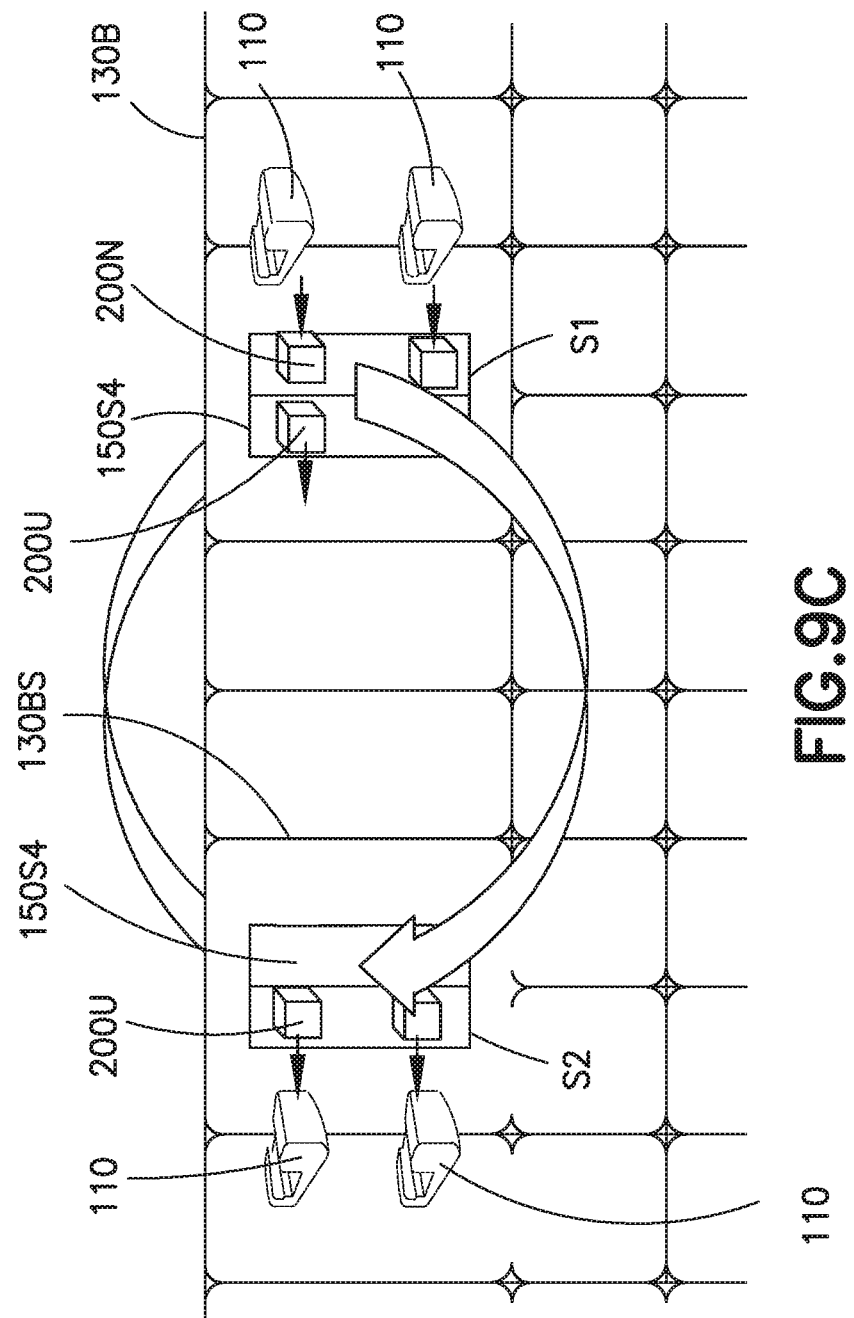

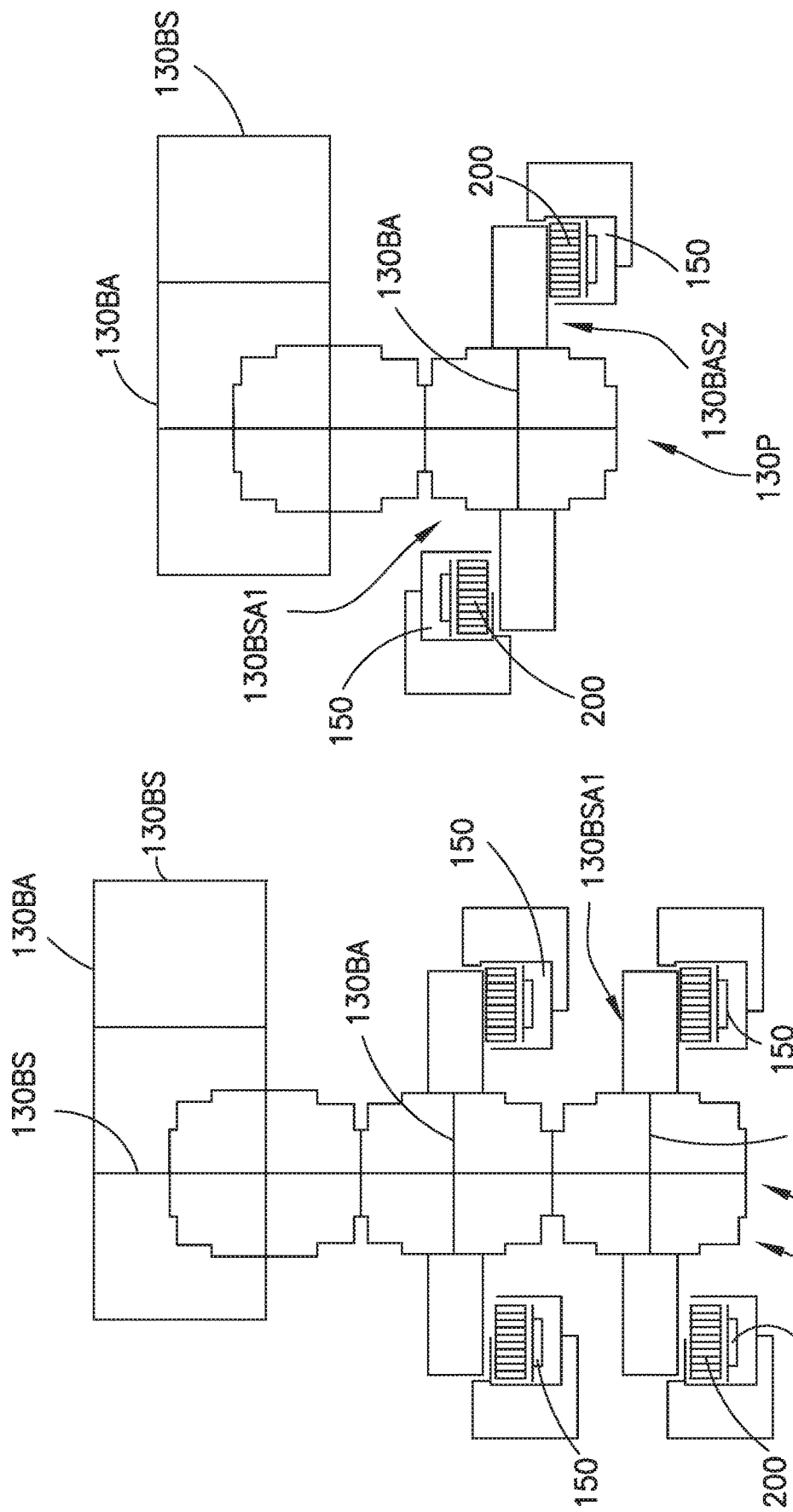

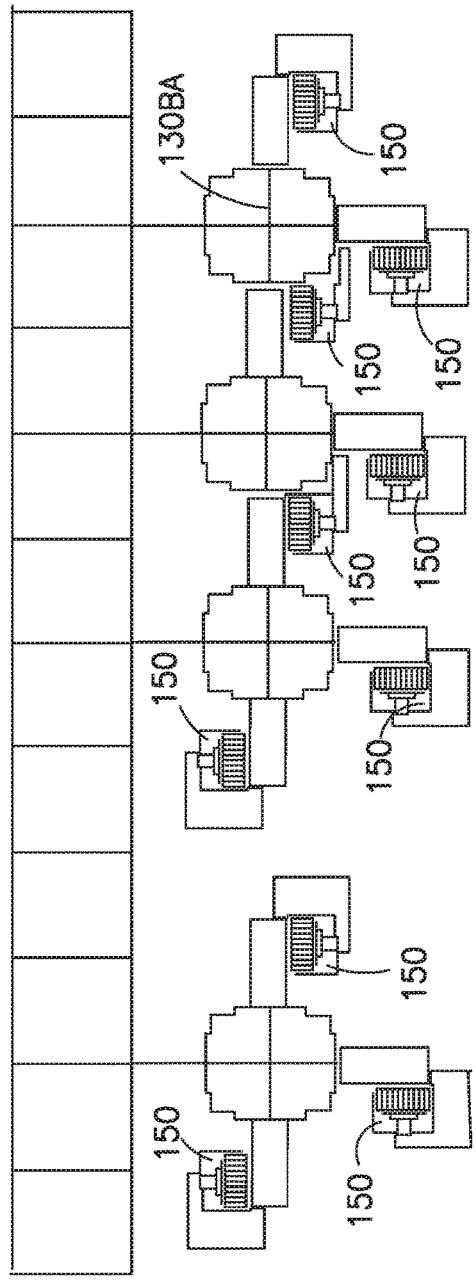
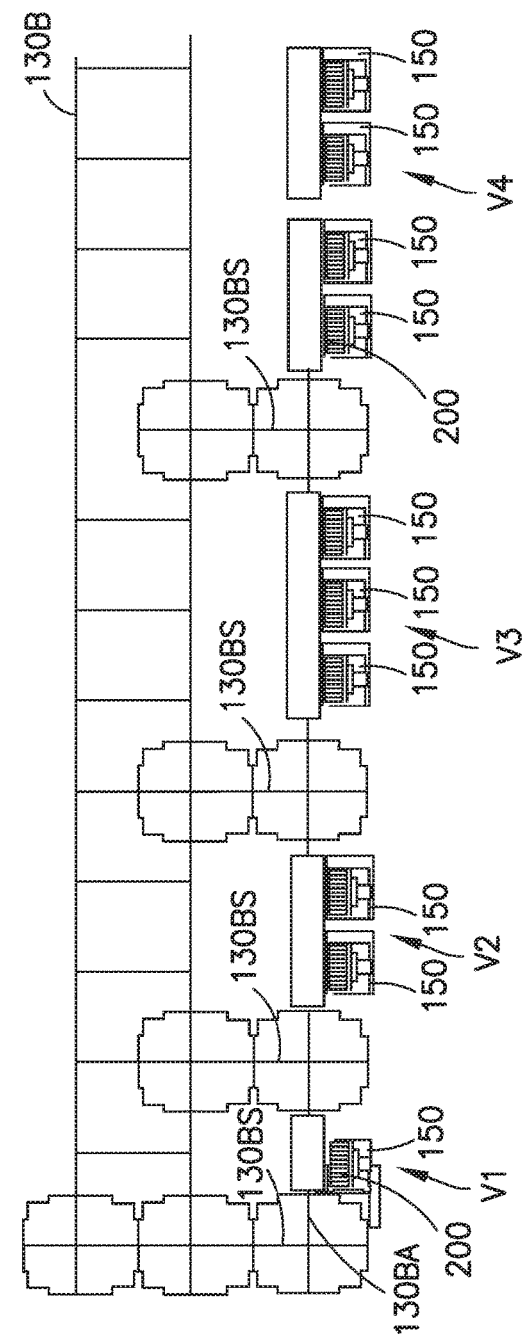

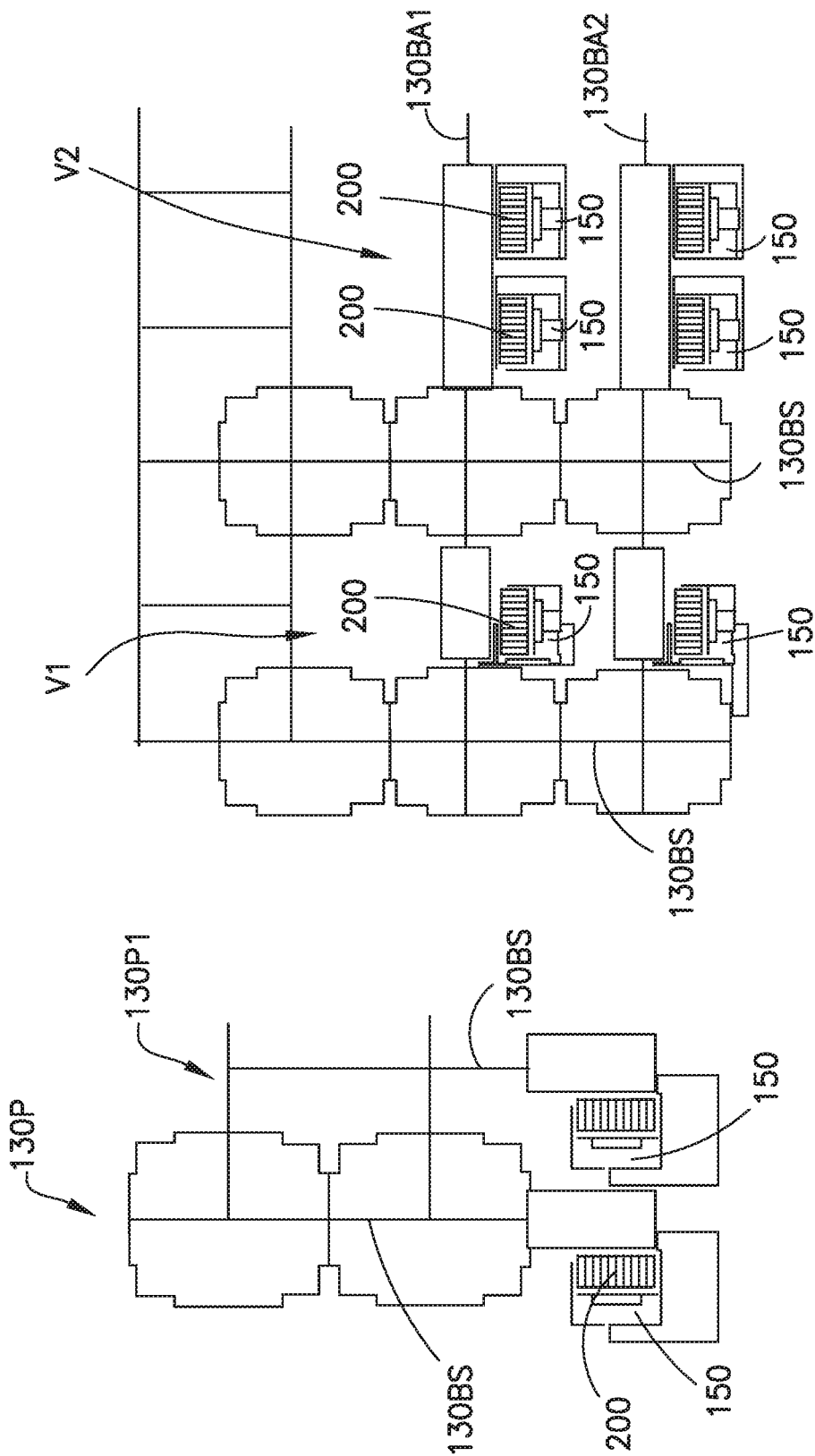

MULTIPOSITION LIFT

CROSS-REFERENCE TO RELATED APPLICATIONS

This application is a continuation of U.S. application Ser. No. 15/339,548 filed Oct. 31, 2016 (now U.S. Pat. No. 10,035,650) which is a continuation of U.S. application Ser. No. 14/215,289 filed Mar. 17, 2014 (now U.S. Pat. No. 9,481,517) which is a non-provisional of and claims the benefit of U.S. Provisional Patent Application No. 61/791,251 filed Mar. 15, 2013, the disclosures of which are incorporated herein by reference in their entireties.

BACKGROUND

1. Field

The exemplary embodiments generally relate to material handling systems and, more particularly, to transport of items within the material handling system.

2. Brief Description of Related Developments

Multilevel storage and retrieval systems may be used in warehouses for the storage and retrieval of goods. Generally the transportation of goods into and out of the storage structure is done with lifts for transfer to a vehicle on a storage level, vehicles travelling up ramps to a predetermined storage level, or with vehicles that include lifts traveling along guide ways. Throughput of these storage and retrieval systems may be limited by one or more of the retrieval of the goods at a storage level and the transfer of goods between storage levels.

It would be advantageous to balance the throughput so that a storage and retrieval transfer rate of one or more levels substantially matches a goods transfer rate between levels of the storage and retrieval system.

BRIEF DESCRIPTION OF THE DRAWINGS

The foregoing aspects and other features of the disclosed embodiment are explained in the following description, taken in connection with the accompanying drawings, wherein:

FIGS. 2-19 are schematic illustrations of portions of the automated storage and retrieval system in accordance with aspects of the disclosed embodiment.

DETAILED DESCRIPTION

Figure 1:
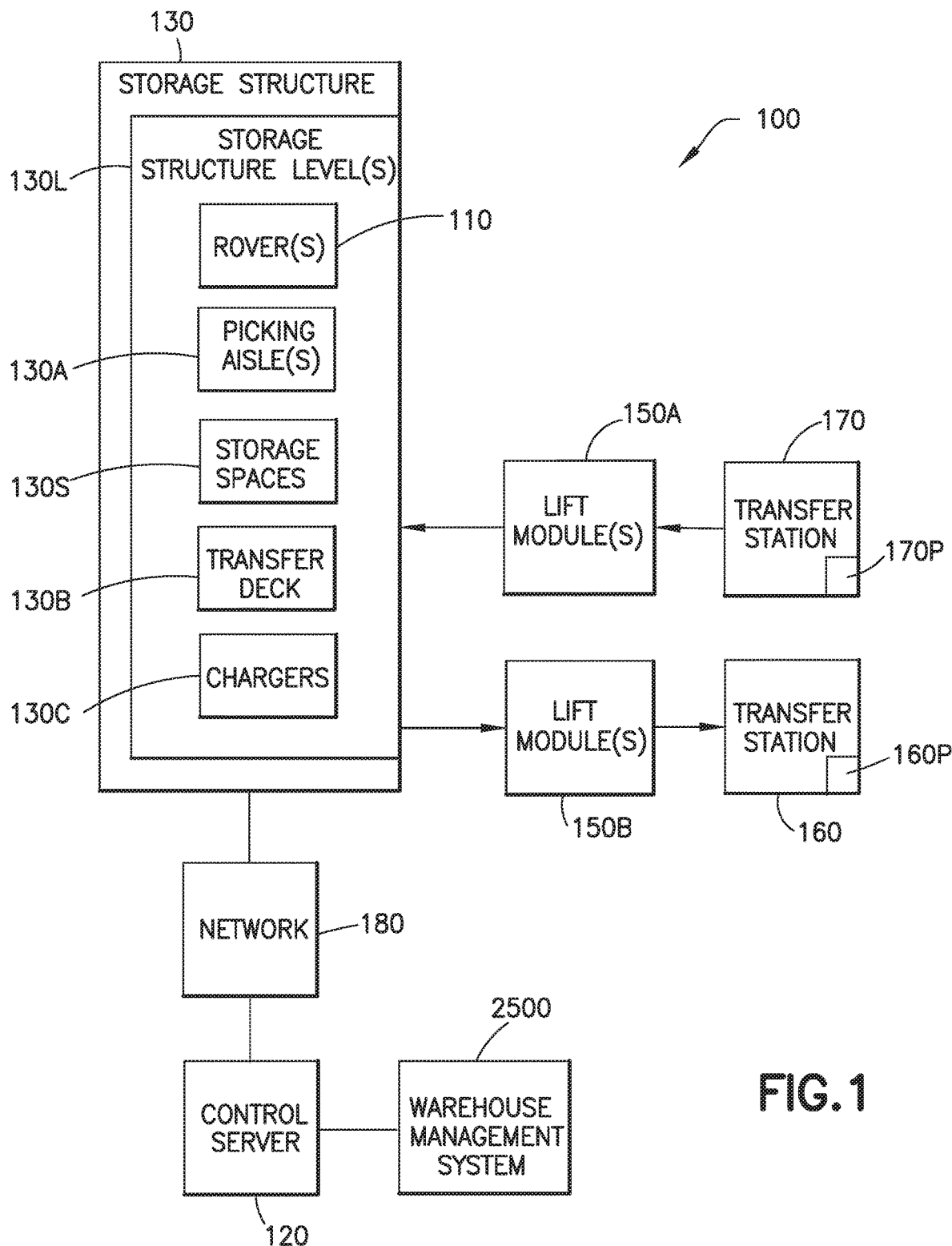
FIG. 1 is a schematic illustration of an automated storage and retrieval system in accordance with aspects of the disclosed embodiment.

FIG. 1 is a schematic illustration of an automated storage and retrieval system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In accordance with aspects of the disclosed embodiment the automated storage and retrieval system 100 may operate in a retail distribution center or warehouse to, for example, fulfill orders received from retail stores for case units such as those described in U.S. patent application Ser. No. 13/326,674 filed on Dec. 15, 2011, the disclosure of which is incorporated by reference herein in its entirety.

The automated storage and retrieval system 100 may include in-feed and out-feed transfer stations 170, 160 (which may include palletizers 160P and/or depalletizers 170P), input and output vertical lift modules 150A, 150B (generally referred to as lift modules 150—it is noted that while input and output lift modules are shown, a single lift module may be used to both input and remove items from the storage structure), a storage structure 130, and a number of autonomous rovers 110. It is noted that the depalletizers 170P may be configured to remove items from pallets so that the in-feed transfer station 170 can transport the items to the lift modules 150 for input into the storage structure 130. The palletizers 160P may be configured to place items removed from the storage structure 130 on pallets for shipping. The storage structure 130 may include multiple levels 130L of storage rack modules. Each storage level 130L includes storage spaces 130S and storage or picking aisles 130A which, e.g., provide access to the storage spaces 130S and transfer decks 130B over which the rovers 110 travel on a respective storage level 130L for transferring case units between any of the storage spaces 130S of the storage structure 130 and any shelf of the lift modules 150. Each storage level 130L may also include charging stations 130C for charging an on-board power supply of the rovers 110 on that storage level 130L.

The rovers 110 may be any suitable independently operable autonomous vehicles capable of carrying and transferring case units throughout the storage and retrieval system 100. In one aspect the rovers 110 may be automated, independent (e.g. free riding) rovers. Suitable examples of rovers can be found in, for exemplary purposes only, U.S. patent application Ser. No. 13/326,674 filed on Dec. 15, 2011; U.S. patent application Ser. No. 12/757,312 filed on Apr. 9, 2010; U.S. patent application Ser. No. 13/326,423 filed on Dec. 15, 2011; U.S. patent application Ser. No. 13/326,447 filed on Dec. 15, 2011; U.S. patent application Ser. No. 13/326,505 Dec. 15, 2011; U.S. patent application Ser. No. 13/327,040 filed on Dec. 15, 2011; U.S. patent application Ser. No. 13/326,952 filed on Dec. 15, 2011; and U.S. patent application Ser. No. 13/326,993 filed on Dec. 15, 2011, the disclosures of which are incorporated by reference herein in their entireties. The rovers 110 may be configured to place case units, such as the above described retail merchandise, into picking stock in the one or more levels of the storage structure 130 and then selectively retrieve ordered case units for shipping the ordered case units to, for example, a store or other suitable location.

The rovers 110, lift modules 150 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired networks using any suitable type and/or number of communication protocols. In one aspect, the control server 120 may include a collection of substantially concurrently running programs (e.g. system management software) for substantially automatic control of the automated storage and retrieval system 100. The collection of substantially concurrently running programs may be configured to manage the storage and retrieval system 100 including, for exemplary purposes only, controlling, scheduling, and monitoring the activities of all active system components, managing inventory (e.g. which case units are input and removed and where the case units are stored) and pickfaces (e.g. one or more case units that are movable as a unit), and interfacing with the warehouse management system 2500.

One or more of the lift module 150, transfer deck 130B, picking aisles 130A, storage spaces 130S, transfer stations 160, 170 and rovers 110 may form one or more of a first independently operable section and a second independently operable section. The first independently operable section may have a first number of predetermined storage and retrieval transactions and the second independently operable section, which is in communication with the first independently operable section, may have a second number of predetermined storage and retrieval transactions. The first and second independently operable sections may be configured to provide a respective number of predetermined storage and retrieval transactions so that the first number of predetermined storage and retrieval transactions substantially matches the second number of predetermined storage and retrieval transactions. In one aspect one or more of the lift modules 150 may form the first independently operable section such that the first number of predetermined storage and retrieval transactions comprises a vertical transaction rate. One or more of the storage levels (which may include at least the rovers 110, picking aisles 130A, transfer deck 130B and storage spaces 130S on a respective storage level) may form the second independently operable section such that the second number of predetermined storage and retrieval transactions comprises a horizontal or level transaction rate. The vertical transaction rate may be a pickface (e.g. payload) transfer rate to a predetermined vertical storage level of the automated storage and retrieval system and the horizontal transaction rate may be one or more of a pickface transfer rate of a predetermined storage level 130L and/or a pickface transaction rate of a palletizer or depalletizer.

In one aspect the horizontal transaction rate may be addressed through optimized planning and control software of controller 120 that may assign tasks and routes to rovers 110 in an efficient manner or in any other suitable manner. The horizontal transaction rate may also be increased by increasing the average speed of the rovers 110 in any suitable manner. The vertical transaction rate may depend on, for example, the number of seconds between successive shelves 150S passing an output of a lift module 150 on output of pickfaces or an input of the lift module 150 on input of pickfaces. The vertical transaction rate may be addressed by increasing the number of pickface holding or load positions 200 (FIG. 2) on each lift module 150 shelf 150S and/or increasing the number of lift modules 150 as will be described in greater below. It is noted, as will also be seen below, increasing the vertical transaction rate may reduce the number of lift modules 150, reduce an area of the transfer deck 130B and/or allow bi-directional operation of lift modules 150 in which a single lift module 150 handles both input and output of pickfaces. In other aspects throughput (e.g. the horizontal and/or vertical transaction rates) can be increased by reducing the transfer deck lanes and/or avenues or repositioning the lift modules 150 to facilitate an optimized rover 110 traversal time as will be described below.

Figure 2:
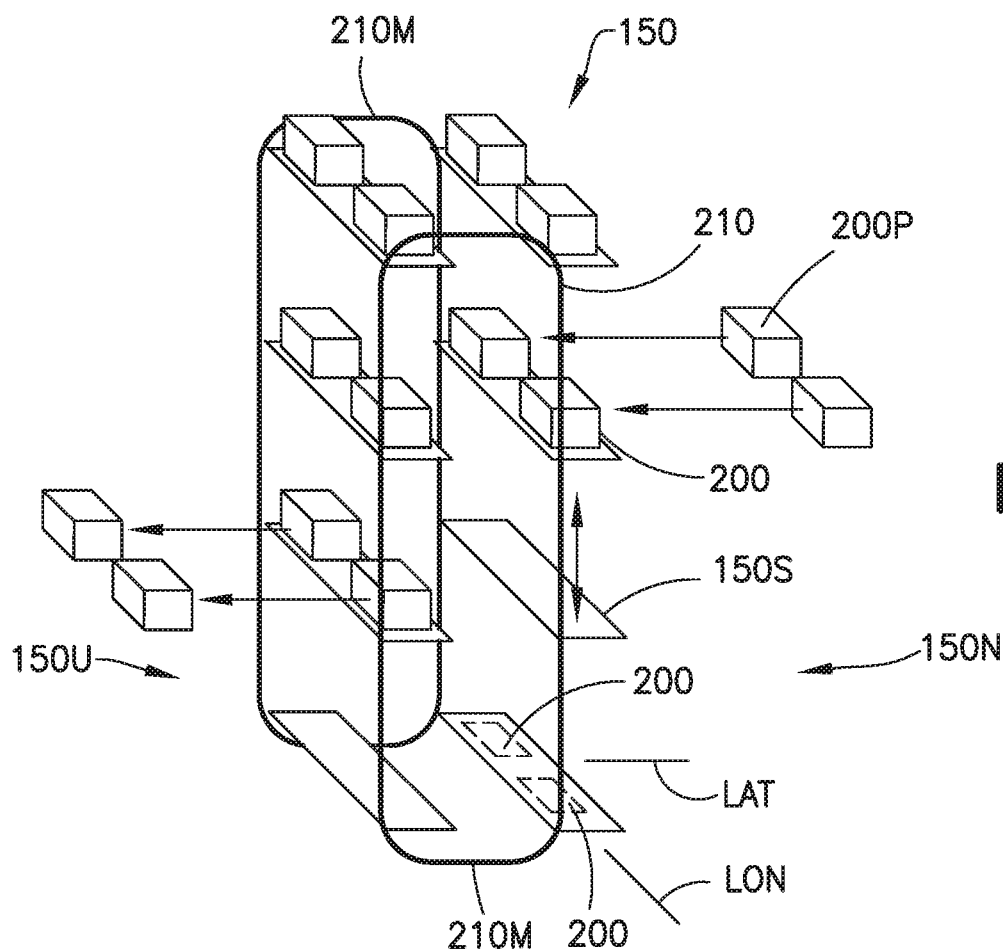
Figure 3:
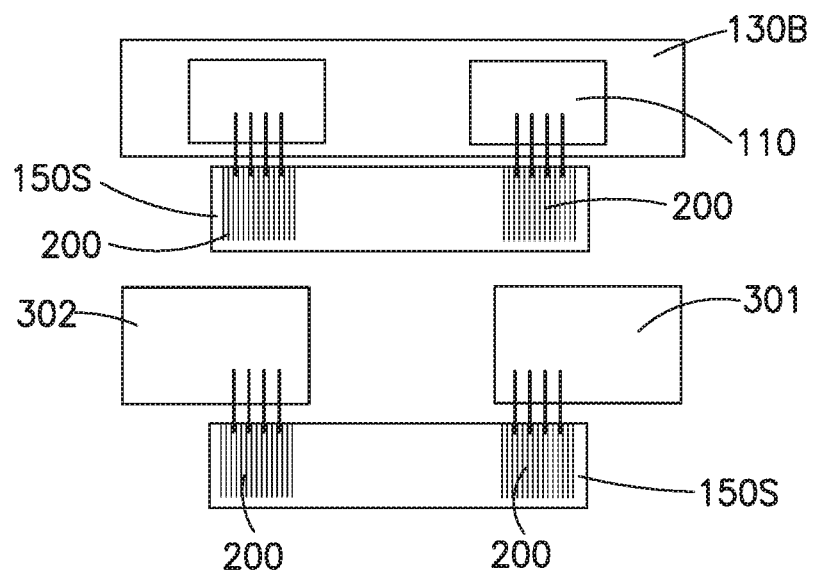

Referring now to FIGS. 2 and 3, a portion of a vertical lift section 150 is shown. The vertical lift module 150 may include one or more shelves 150S that substantially continuously revolve around a track 210 formed by one or more track members 210M. In other aspects the vertical lift module 150 may have any suitable configuration for transporting pickfaces 200P (e.g. one or more case units that are moved as a unit) to and from the different storage levels 130L. Each shelf 150S may have a longitudinal axis LON and a lateral axis LAT. In this aspect, the longitudinal axis LON of the shelf spans substantially between the track members 210M so that the lateral sides of the shelves are adjacent each other with respect to a first side 150N and a second side 150U of the vertical lift module 150 (it is noted, as will be described below, that the two sides may be used for pickface input/output, pickface output/output or pickface input/input). In other aspects the longitudinal sides of the shelves may be adjacent each other with respect to the first side 150N and second side 150U of the vertical lift module 150. The shelves 150S may be configured to hold one or more pickfaces 200P where the one or more pickfaces 200P have any suitable spatial arrangement on the shelves 150S as will be described in greater detail below. For example, each of the shelves 150S shown in FIG. 2 have two side by side loading positions 200 but in other aspects the shelves have any suitable number of loading positions 200 disposed in any suitable spatial relationship.

Pickfaces may be transferred to and from the shelves 150S in any suitable manner. In one aspect the rovers 110 may transfer pickfaces to and from the shelves 150S as the shelves substantially continuously travel around the tracks 210M. In other aspects, as can be seen in FIG. 3 one or more input/output conveyors 301, 302 (generally referred to as a "conveyor" or "conveyors") may also transfer pickfaces to and from the shelves 150S. The conveyors 301, 302 transport the pickfaces between the vertical lift module 150 and one or more of the transfer stations 160, 170. As may be realized the conveyors 301, 302 may be disposed on any suitable side 150N, 150U (which, e.g., may depend on whether pickfaces are being loaded to or unloaded from) of the vertical lift module 150.

Referring now to FIG. 4 several examples of shelf configurations are shown in accordance with aspects of the disclosed embodiment. Here the shelves 150S1-150S3 are shown adjacent transfer deck 130B. The transfer deck 130B includes avenues 130BA and aisles 130BS that provide access to the shelves 150S1-150S3. In these examples the shelves are arranged substantially parallel with the avenues 130BA of the transfer deck. Shelf 150S1 may be substantially similar to that described above with respect to FIGS. 2 and 3. Shelf 150S2 includes two end loading positions 200E1, 200E2 and an intermediate or center loading position 200C. Here the shelf 150S has a length L1 such that only two rovers 110 (which are located side by side or end to end) can access end loading positions 200E1, 200E2 or a single rover 110 can access the center loading position 200C. Here, to utilize the three loading positions 200E1, 200E2, 200C the two end loading positions 200E1, 200E2 may be accessed from one storage level 130L and the center loading position 200C may be accessed from another different storage level 130L. Planning and control software of, for example, the controller 120 may assign rover tasks so that some storage levels 130L may have rovers accessing the end loading positions 200E1, 200E2 and other storage levels 130L may have rovers accessing the center loading position 200C. It is noted that the assignment of which storage levels 130L access the end or center loading positions may not be fixed and may be scheduled dynamically (e.g. in one instance predetermined storage level may access the end loading positions and in another instance the same predetermined level may access the center loading position). Shelf 150S3 also includes three loading positions, e.g. end loading positions 200E1, 200E2 and center loading position 200C. However, the shelf 150S3 has a length L2 such that three rovers 110 can be positioned side by side or end to end without interfering with each other for substantially simultaneous access to all three loading positions 200E1, 200E2, 200C from the same storage level 130L. As may be realized, the payload positions 200 on each shelf 150S may be variably configurable so that the payload positions 200 can be located in any suitable predetermined location on the shelf 150S. In one aspect, the controller 120 may assign rover tasks so that any loading position 200, 200E1, 200E2, 200C on any one of the shelves 150S1, 150S2, 150S3 may be dynamically accessed at any suitable predetermined storage level. In other aspects, access to a predetermined loading position may be fixed to a predetermined storage level 130L.

Referring to FIG. 5, in one aspect, a top view of a shelf 150S having a loading configuration substantially similar to shelf 150S2 is shown. As can be seen, two rovers 110 on storage level 130B1 access the end loading positions 200E1, 200E2 without interfering with each other. Correspondingly conveyors 301, 302 are positioned on a different vertical level relative to storage level 130B1 for loading pickfaces to and/or unloading pickfaces from the end loading positions 200E1, 200E2 of shelf 150S. FIG. 5 also illustrates one rover 110 located on a different storage level 130B2 accessing center loading position 200C. As may be realized, the center loading position 200C may have a corresponding conveyor 501 (substantially similar to conveyors 301, 302) which may be located at a different vertical level than conveyors 301, 302 to load pickfaces to and/or unload pickfaces from the center loading position 200C of the shelf 150S. It is noted that the vertical height of the conveyors 301, 302, 501 and the other conveyors described herein for loading pickfaces to and/or unloading pickfaces from the shelves 150S may be flexible such that one or more of the conveyors may be located at different vertical heights from other conveyors accessing the same or a different shelf 150S.

FIG. 6, in one aspect, illustrates a shelf 150S having four loading positions, e.g., two end loading positions 200E1, 200E2 and two center loading positions 200C1, 200C2. Here, rovers arranged side by side or end to end may be able to access pairs of the loading positions (e.g. every other loading position) without interfering with each other. For example, on one storage level 130B1 rovers 110 may access loading positions 200E1, 200C2 without interfering with each other. On a different storage level 130B2 rovers 110 may access loading positions 200C1 and 200E2 without interfering with each other. As may be realized, each pair of loading positions 200E1, 200C2 and 200C1, 200E2 may have corresponding conveyors disposed at different vertical heights. For example, conveyors 302, 501 may be located at, for example a first vertical height for transferring pickfaces to and from loading positions 200E1, 200C2. Conveyors 301, 601 may be located at, for example, a second vertical height that is different from the first vertical height for transferring pickfaces to and from the loading positions 200C1, 200E2. In other aspects each of the conveyors 301, 302, 501, 604 may be located at different vertical heights.

Figure 7B:
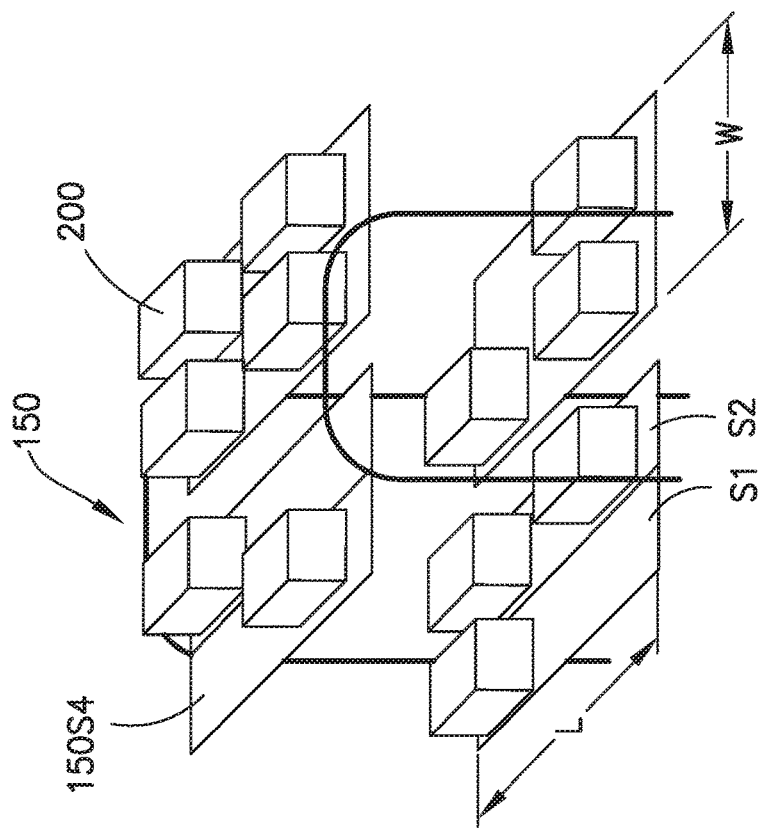

In accordance with another aspect, FIGS. 7A and 7B illustrate a shelf 150S4 having an expanded width W and any suitable length L for holding, for example, two rows of pickfaces (e.g. one row on each side S1, S2 of the shelf) where rovers 110 access the pickfaces from both sides S1, S2 of the shelf 150S4. Conveyors 301, 302, 701, 702 may be positioned relative to the shelves 150S4 for transferring pickfaces to and from the loading positions in a manner substantially similar to that described above. In one aspect as shown with respect to shelf 150S4N all loading positions 200N of the shelf may be used for loading pickfaces to the lift module 150. In another aspect as shown with respect to shelf 150S4U all loading positions 200U of the shelf may be used for unloading pickfaces from the lift module 150. In still other aspects, as will be described below, some of the loading positions 200 of the shelf 150S4 may be used for loading pickfaces to the lift module 150 and some of the loading positions may be used for unloading pickfaces from the lift module 150. As may be realized, the shelf 150S4 may also be configured to hold pickfaces such that each side S1, S2 of the shelf 150S4 may have loading positions arranged in a manner substantially similar to those described above with respect to FIG. 4. As may also be realized, whether the loading positions are used for loading or unloading may be determined by a direction of travel of the shelf relative to a transfer station (either of the storage levels 130L or conveyors) from which the loading positions are accessed.

Figure 7E:
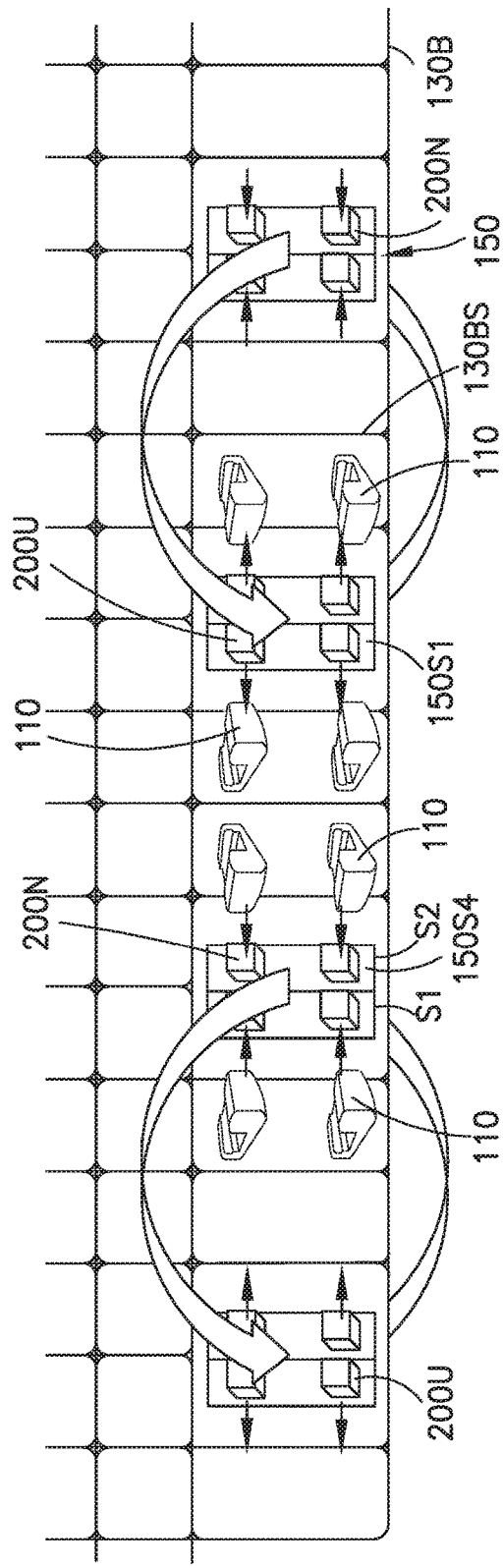
Figure 7F:
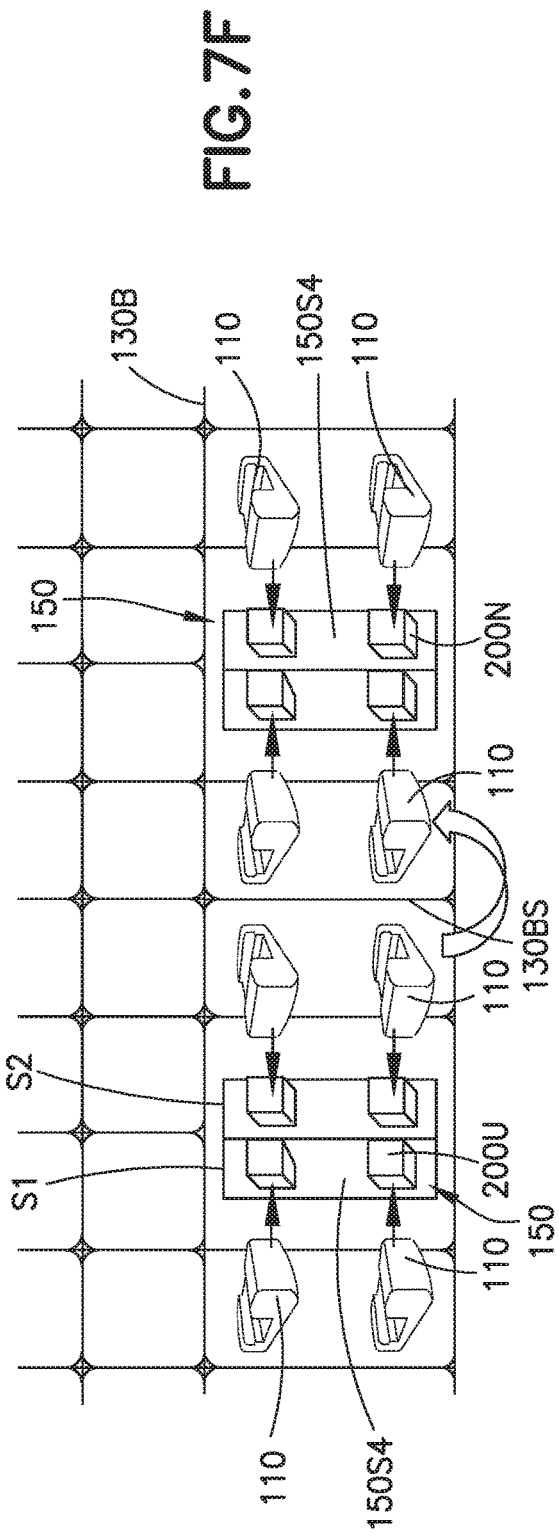
Figure 7G:
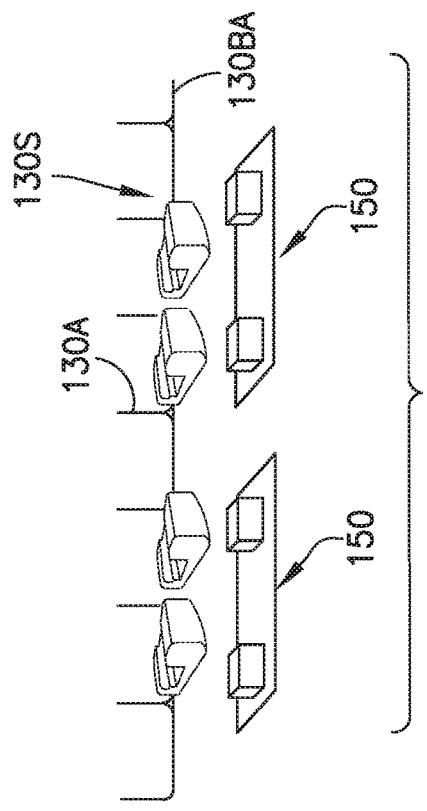
Figure 7H:
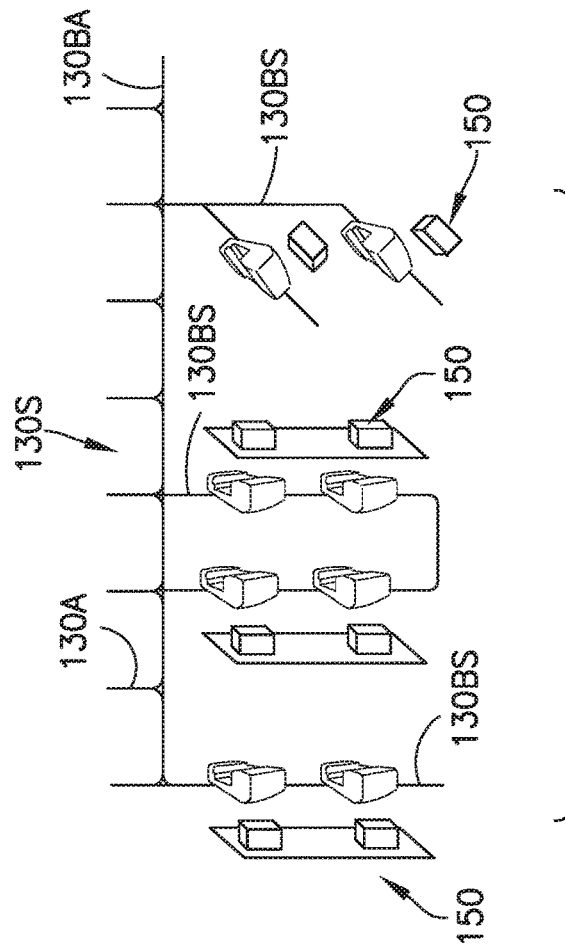
Figure 7I:
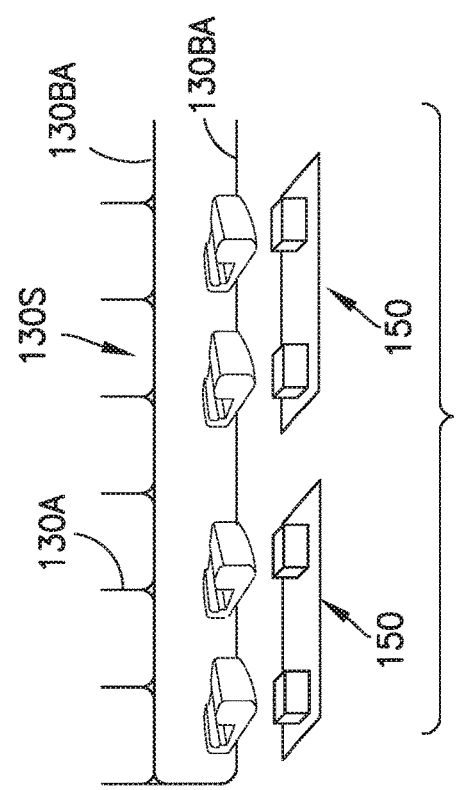
Figure 7J:
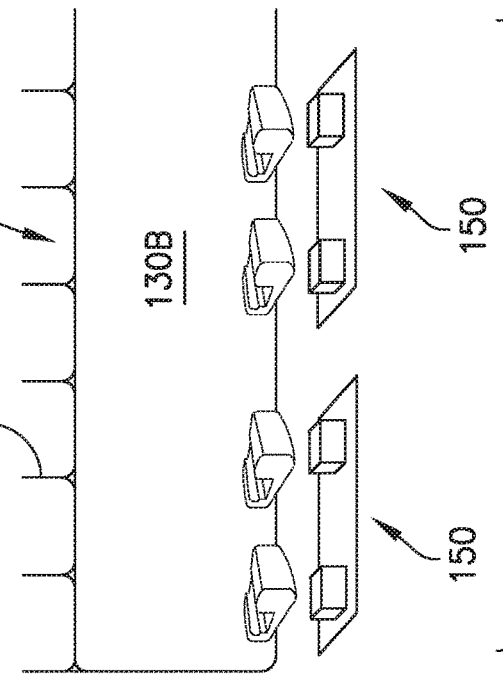
Figure 8A:
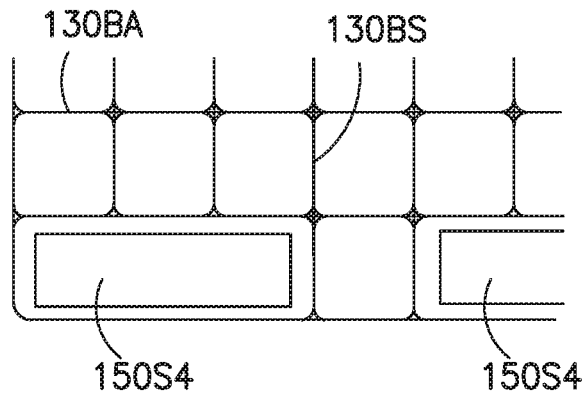
Figure 8B:
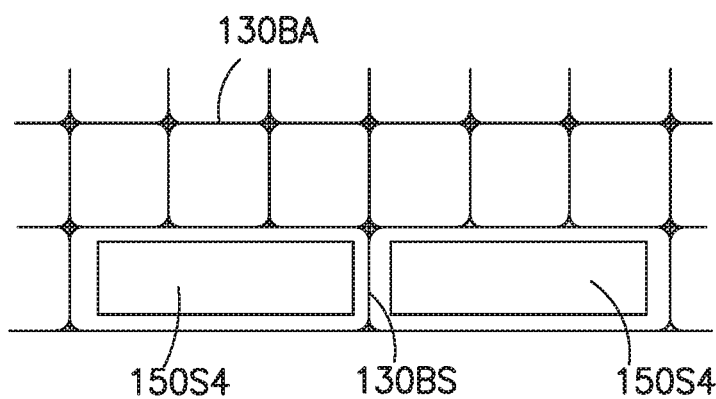

Referring now to FIGS. 7C-7F, to allow rover access to both sides S1, S2 of the shelf 150S4 one or more lift modules 150 may be positioned relative to, for example, the transfer deck 130D so that one or more of the aisles 130BS and/or avenues 130BA run along a respective side S1, S2 of the shelf 150S4. For example, as can be seen in FIGS. 7C and 7D the lift module 150 is arranged so that access to each side S1, S2 of the shelf 150S4 is provided by an avenue 130BA of the transfer deck 130B such that the lift module 150 is substantially surrounded by aisles 130BS and avenues 130BA. As may be realized, an area of the transfer deck 130B may be reduced by removing, for example, avenues 130BA from the transfer deck. As an example, the transfer deck area is reduced from FIG. 7C to 7D by removing one or more avenues 130BA on a side of the lift module 150 opposite the picking aisles 130A. In other aspects, avenues 130BA between the lift module 150 and the picking aisles 130A may be removed to reduce the area of the transfer deck 130B. In accordance with an aspect of the disclosed embodiment, as can be seen in FIGS. 7E and 7F, one or more of the lift modules 150 may be positioned relative to the transfer deck 130B so that access to the loading positions on the sides S1, S2 of the shelves 150S4 is provided by the aisles 130BS of the transfer deck 130B. As may be realized, where access to the loading positions is provided by the aisles 130BS an area of the transfer deck may be reduced by eliminating a number of aisles 130BS between the shelves 150S4 (as shown in FIGS. 8A and 8B) and/or by eliminating avenues 130BA on either side of the lift modules 150. It is also noted that the line of shelves 150S4 shown in FIGS. 7E and 7F alternate between having loading stations 200N and loading stations 200U (e.g. an input lift module is placed next to an output lift module) so that the distance travelled by a rover between transferring a pickface to a loading position 200N and then transferring a pickface from a loading position 200U may be a shorter distance than when access to the sides S1, S2 is provided by the avenues 130BA. In other aspects the shelves, as shown in FIGS. 7C and 7D may be arranged so that the sides S1 of each line of shelves accessed by a common avenue 130BA may alternate between loading positions 200N and loading positions 200U (e.g. an input lift module is placed next to an output lift module) so that a distance travelled by the rovers 110 between loading and unloading pickfaces to a shelf is substantially the same as the distance travelled when the sides are accessed by the aisles 130BS. It is noted that in other aspects an area of the transfer deck 130B aisles 130BS may be removed between adjacent lift module 150 (FIG. 7G), the lift modules 150 may be placed directly adjacent the picking aisles 130A (FIG. 7H), the transfer deck may be configured as an open deck substantially lacking aisles 130BS and avenues 130BA (FIG. 7I), and/or the transfer deck or picking aisles of the storage structure may form piers, e.g. with the aisles 130BS, where the aisles 130BS extend from an avenue 130BA of the transfer deck as will be described below. In still other aspects the area of the transfer deck may be reduced in any suitable manner.

Figure 9B:
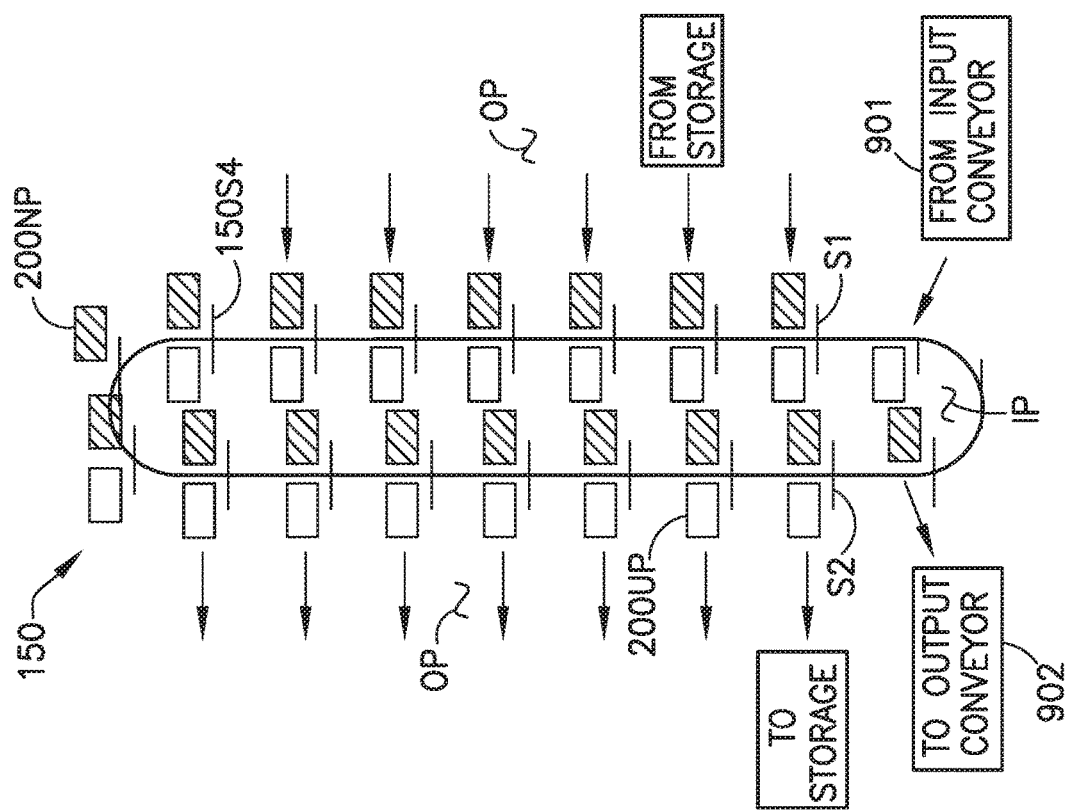
Figure 9A:
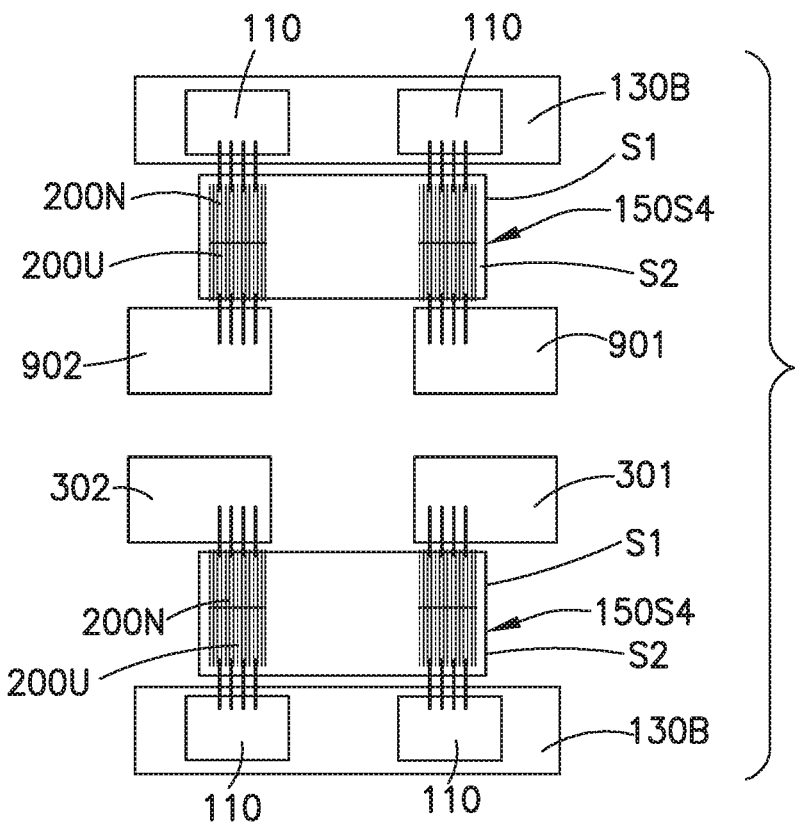
Figure 10:
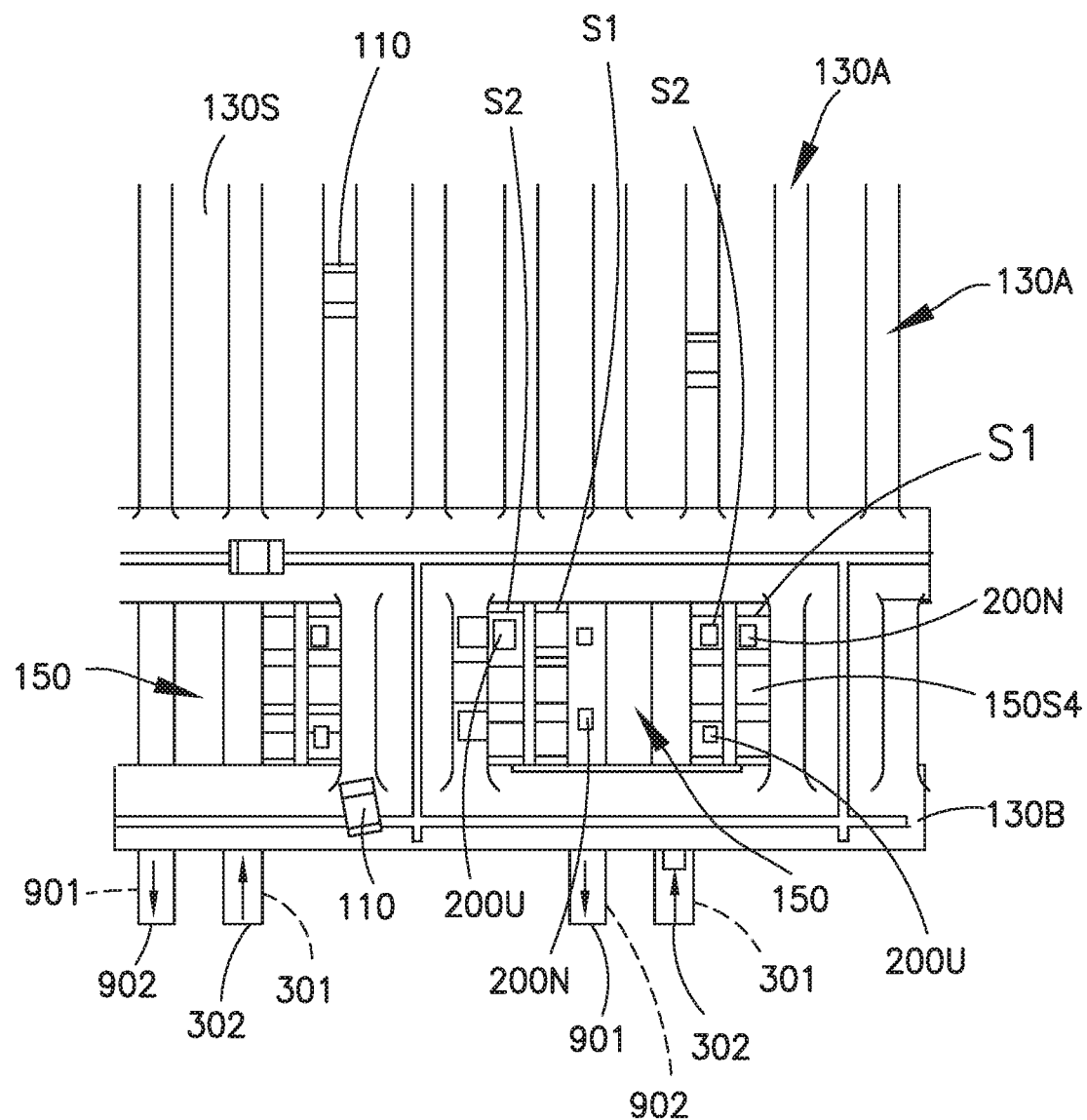
Figure 11:
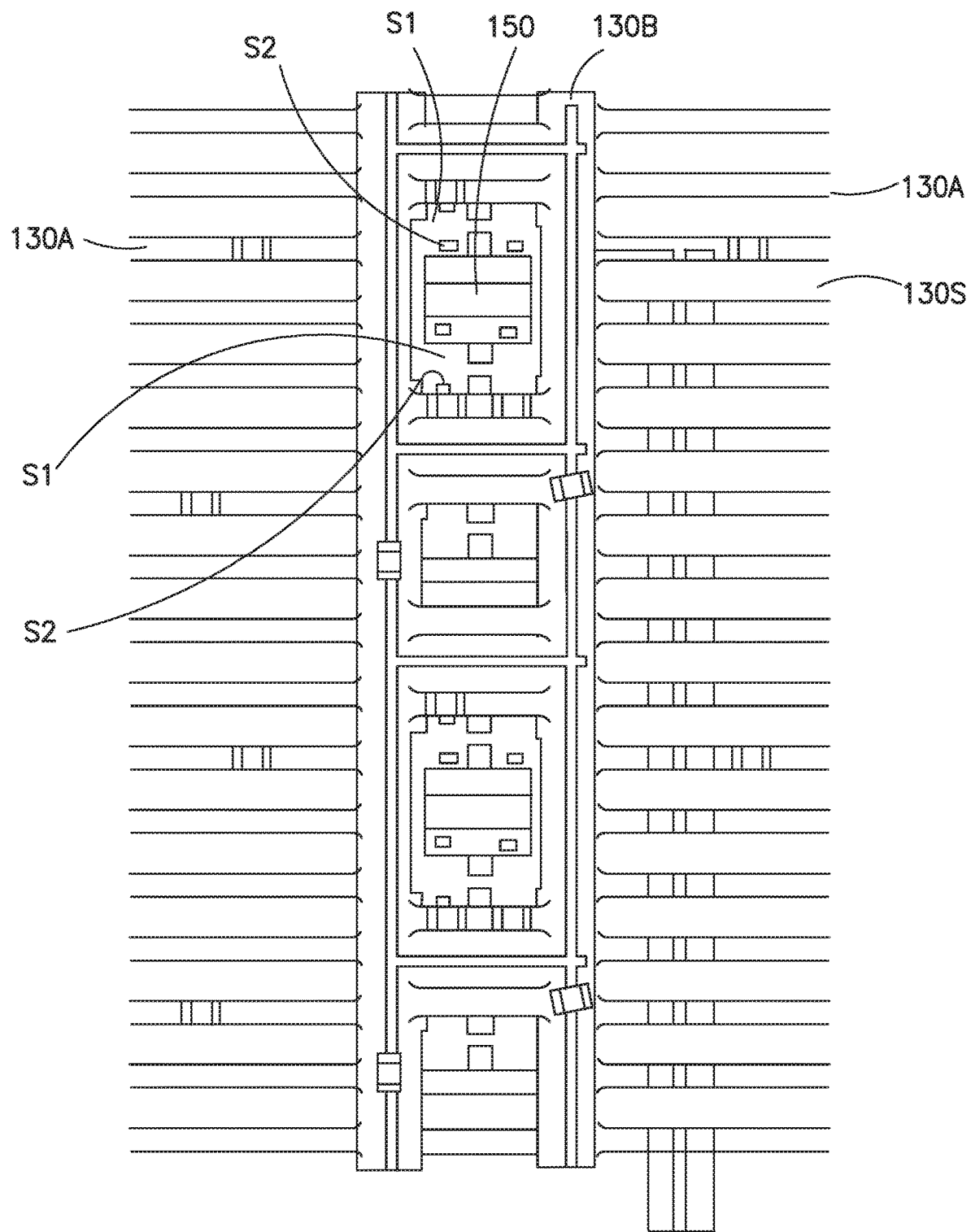

As noted above, shelf 150S4 may also be used for both pickface loading and pickface unloading operations. For example, side S1 of shelf 150S4 may be used for loading pickfaces onto the shelf while side S2 of the same or common shelf 150S4 may be used for unloading pickfaces from the shelf as shown in FIGS. 9A-9C, 10 and 11. This allows for both input and output of pickfaces to and from the storage structure 130 using a common or the same lift module 150. For example, side S1 of shelf 150S4 may have loading positions 200N for loading pickfaces to the shelf 150S4 while side S2 may have loading positions 200U for unloading pickfaces from the shelf 150S4. As can be seen in FIGS. 9A and 9B, transfer deck 130B access to the loading positions 200N, 200U may be from an outside position OP of the lift module while access to loading positions by conveyors 301, 302, 901, 902 may be from an inside position IP (e.g. an area between the vertical stacks of shelves). In other aspects transfer deck 130B access to the loading positions 200N, 200U may be from an inside position IP of the lift module while access to loading positions by conveyors 301, 302, 901, 902 may be from an outside position OP (e.g. an area between the vertical stacks of shelves). It is noted that while each side S1, S2 of a shelf 150S4 is shown as having two loading positions in other aspects there may be any suitable number of loading positions having any suitable arrangement such as those described above with respect to FIG. 4. FIG. 9B may be referred to, for explanation purposes, as illustrating a common shelf 150S4 having both loading positions 200N, 200U for both loading and unloading pickfaces. The pickfaces 200NP having a hatched pattern represent pickfaces on a loading position 200N (e.g. loading on the lift module from storage) while the shaded pickfaces 200UP represent pickfaces on a loading position 200U (e.g. unloading from the lift module to storage). The pickfaces 200NP from input conveyor 901 (which may be included in input transfer station 170—FIG. 1) are loaded on the shelves 150S4 in any suitable manner from, for example, an inside position IP of the lift module 150 so that the pickfaces 200NP are disposed towards the inside of the lift module 150 when loaded on the lift module 150. When the shelves 150S4 travel over the top of the lift module 150 to an opposite side, the pickfaces become disposed on an outside of the lift module 150 and are accessible by rovers 110 disposed at each storage level 130L for offloading the pickfaces from the lift module 150. At the same time pickfaces 200UP are loaded by rovers 110 onto the shelves 150S4 from an outside of the lift platform 150S4. When the pickfaces 200UP travel over the top of the lift module 150S4 the pickfaces 200UP become disposed on an inside of the lift module 150 travelling downwards to the conveyor 902 (which may be included in the output transfer station 160—FIG. 1) for offloading the pickfaces from the lift module 150 to the conveyor 902. In contrast to input only or output only lift modules the bi-directional lift module shown in FIGS. 9A-9B allows for simultaneous use of the shelves 150S4 travelling both up and down. As can be seen in FIGS. 10 and 11, access to both sides S1, S2 of the shelves 150S4 may be provided in a manner substantially similar to that above such that the aisles 130BS or avenues 130BA of the transfer deck 130B substantially surround the lift module 150 so that one or more of the aisles 130BS or avenues 130BA provide access to the shelves 150S4, e.g. depending on the orientation of the shelves 150S4 relative to the transfer deck (as noted above). It is also noted that in one aspect the storage structure 130 may be arranged such that picking aisles 130A and storage spaces 130S are disposed only on one side of the lift modules 150 (FIG. 10) while in other aspects picking aisles 130A and storage spaces 130S may be disposed on two or more sides of the lift modules 150 (FIG. 11).

While multi-position lift modules have been described above, in accordance with aspects of the disclosed embodiment the lift modules 150 may include shelves having only a single loading position 200. For example, referring to FIG. 12A a storage structure 130 is shown having a transfer deck 130B with, e.g., twenty-four single lift modules 150 each having a single load position 200. Compared to a storage structure having a similar transfer deck but with two input lift modules and two output lift modules with, for example, two load positions on each shelf, the number of load positions 200 and vertical transactions that can occur with the configuration shown in FIG. 12A may be higher. The controller 120 may adjust the rover tasks accordingly so that the horizontal transfer rate of each storage level 130L substantially matches the vertical transfer rate of the lift modules 150. In other aspects the controller may adjust the transfer rate of the transfer stations 160, 170 to substantially match the vertical transfer rate of the lift modules. As may be realized, the storage structure 130 and lift module 150 configuration shown in FIG. 12A is merely exemplary and in other aspects the storage structure and lift modules may have any suitable configuration with any suitable number of lift modules (which may have one or more loading positions on each shelf).

Figure 12A:
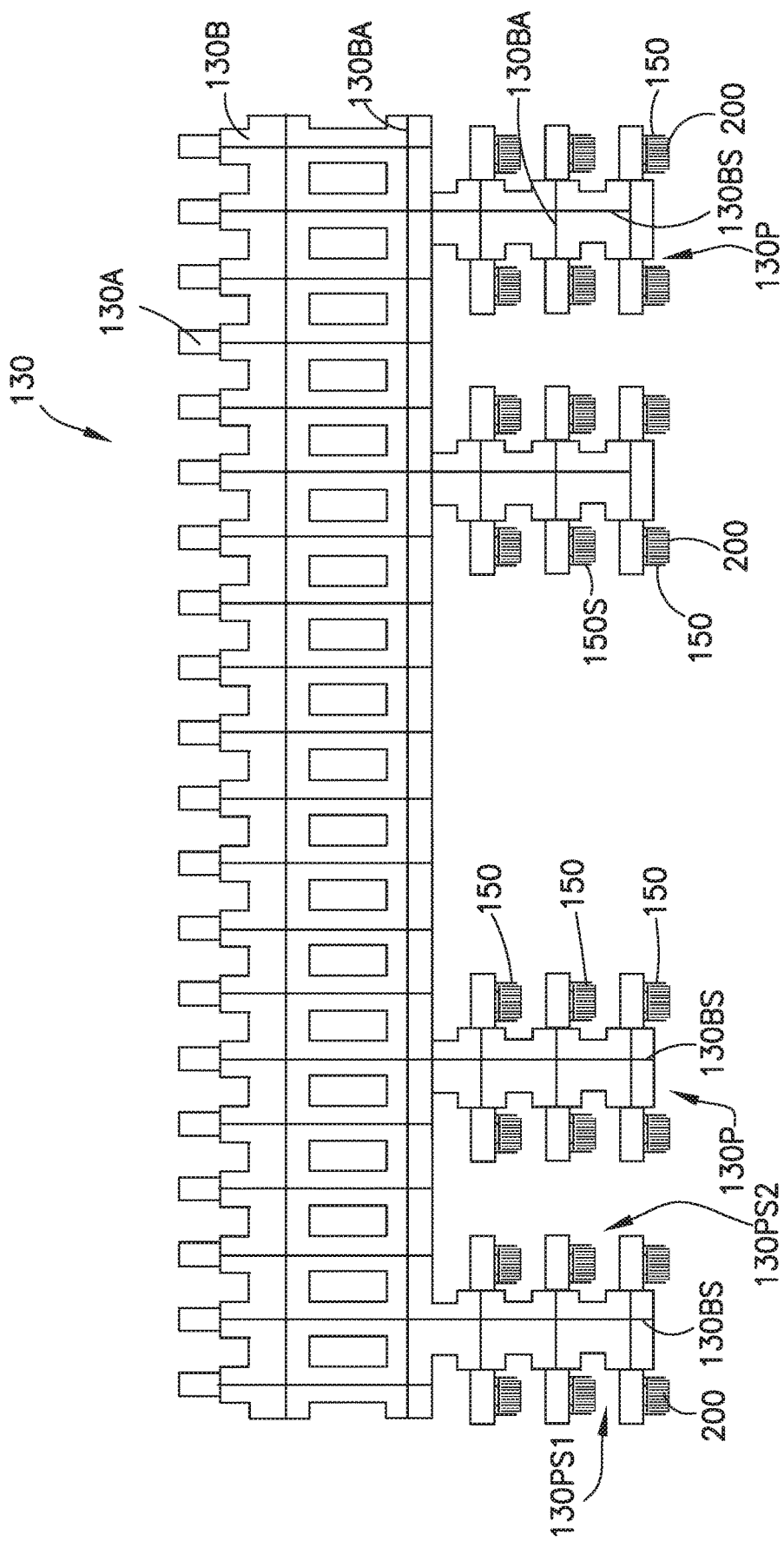

In one aspect, as shown in FIG. 12A, one or more aisles 130BS of the transfer deck may extend from the transfer deck 130B to form a respective pier 130P (e.g. an extension of the transfer deck). Each pier may include avenues 130BA that provide access to the loading position 200 of each shelf 150S for lift modules 150 located on one or more lateral sides 130PS1, 130PS2 of a respective pier 130P. As may be realized, the pier 130P may have any suitable length to accommodate any suitable number of lift modules 150. As can be seen in FIG. 13, the load position for each lift module 150 disposed along an avenue 130BA of a pier 130P may be positioned along one or more sides 130BAS1, 130BAS2 of the avenue 130BA. FIG. 12B is a schematic view of a portion of the storage structure 130 shown in FIG. 12A. As can be seen in FIG. 12B the load positions 200 for each lift module 150 are disposed on a common side 130BAS2 of each avenue 130BA of the pier 130P. In another aspect, as shown in FIG. 13, the load positions 200 are on opposite sides 130BAS1, 130BAS2 of the avenue 130BA.

Figure 15:
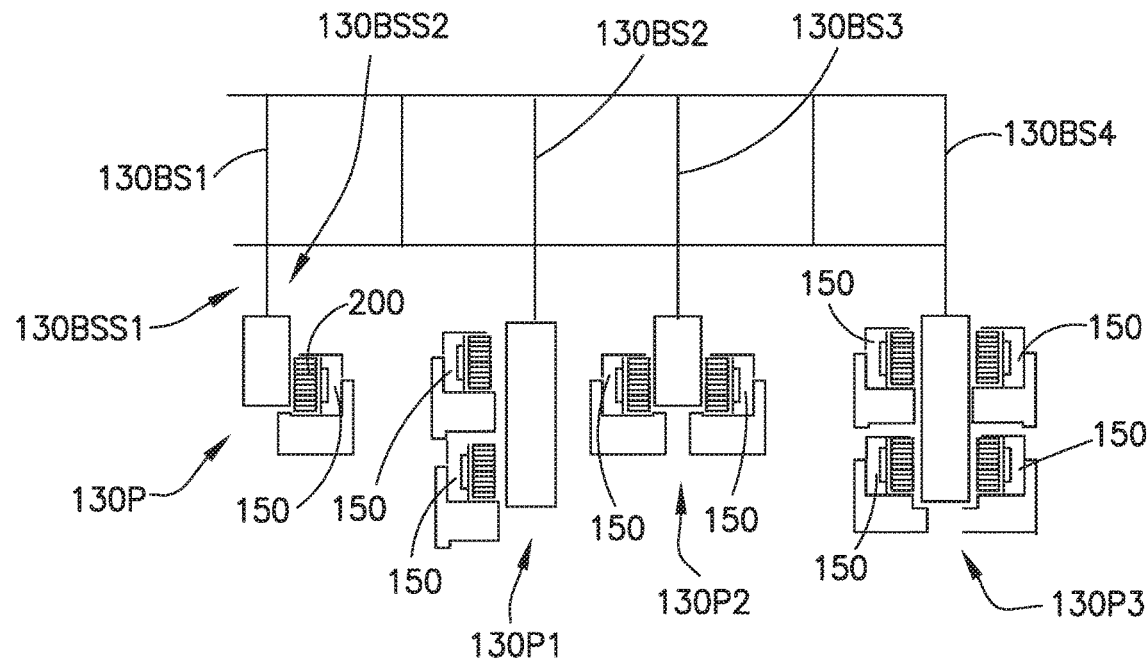

In another aspect, as shown in FIGS. 14 and 15 the aisle 130BS of the pier 130P may provide access to a loading position 200 of a lift module such that the loading position is disposed at an end of the pier 130P. As can be seen in FIG. 14 immediately adjacent aisles 130BS may form piers 130P, 130P1 so that the load positions are arranged in a side by side configuration. In other aspects there may be one or more aisles 130BS between piers (see FIGS. 12A and 15). As can be seen in FIG. 15 four piers are formed by the aisles 130BS1-130BS4 where piers 130P1 and 130P2 are immediately adjacent one another and piers 130P and 130P1 as well as piers 130P2 and 130P3 have an aisle separating the piers. As can be seen in FIG. 15 the load positions 200 are disposed as an end of each pier in a manner substantially similar to that described with respect to FIG. 14. As can also be seen in FIG. 15, any suitable number of loading positions 200 may be disposed along one or more sides 130BSS1, 130BSS2 of each pier 130P-130P3.

Figure 16:
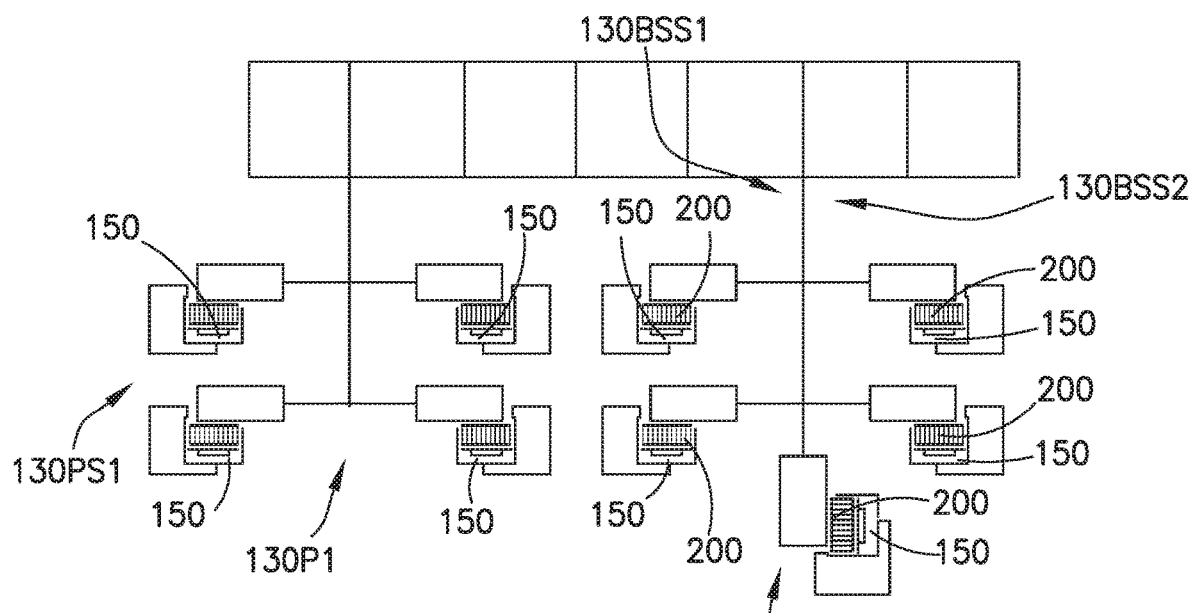

In accordance with another aspect of the disclosed embodiment, FIGS. 16 and 17 are examples of pier arrangement where loading stations 200 are disposed on both the sides 130PS1, 130PS2 and the ends of the piers. The piers may be single piers as shown in FIG. 16 (see also pier 13PS) or ganged piers 130PT (FIG. 17). The ganged piers 130PT may include two or more piers connected to each other through, for example, one or more avenues 130BA of the piers.

FIGS. 18 and 19 illustrate single loading position 200 lift modules 150 arranged in a manner substantially similar to that described above with respect to FIGS. 4, 7C-7I, 8A, 8B, 9C, and 11 such that access to each loading station 200 is provided by an avenue 130BA along the transfer deck 130B. The area of the transfer deck 130B providing access to the loading positions may be referred to as a vestibule. FIG. 18 illustrates two vestibules V1, V2 each having two rows of lift modules each having one or more load position 200 where avenue 130BA1 provides access to one row of lift modules and avenue 130BA2 provides access to another row of lift modules. As may be realized the vestibules V1, V2 may include more or less than two rows of lift modules. It is also noted that each vestibule V1, V2 may include one or more side by side lift modules 150. For exemplary purposes only, each avenue 130BA1, 130BA2 of vestibule V1 provides access to one lift module 150 while each avenue 130BA1, 130BA2 of vestibule V2 provides access to two side by side lift modules 150. Similarly, FIG. 19 illustrates a transfer deck configuration having four vestibules V1-V4 where vestibule V1 provides access to a single load position 200, vestibule V2 provides access to two load positions 200, vestibule V3 provides access to three load positions 200 and vestibule V4 provides access to four load positions 200. As may be realized, the load positions in each vestibule may be provided by a single lift module (e.g. having multiple loading positions) or multiple lift modules (e.g. having single loading positions).

In accordance with one or more aspects of the disclosed embodiment an automated storage and retrieval system includes a first independently operable section having a first number of predetermined storage and retrieval transactions; and a second independently operable section in communication with the first independently operable section and having a second number of predetermined storage and retrieval transactions; where the first and second independently operable sections are configured to provide a respective number of predetermined storage and retrieval transactions so that the first number of predetermined storage and retrieval transactions substantially matches the second number of predetermined storage and retrieval transactions.

In accordance with one or more aspects of the disclosed embodiment the first number of predetermined storage and retrieval transactions comprises a vertical transaction rate and the second number of predetermined storage and retrieval transactions comprises a horizontal transaction rate. In another aspect the vertical transaction rate comprises a payload transfer rate to a predetermined vertical storage level of the automated storage and retrieval system and the horizontal transaction rate comprises one or more of a payload transfer rate of the predetermined vertical storage level and a payload transaction rate of a palletizer or depalletizer.

In accordance with one or more aspects of the disclosed embodiment the automated storage and retrieval system further includes at least one vertical lift module; a transfer deck section in communication with the at least one vertical lift module; at least one storage section in communication with the transfer deck; and at least one independently operable rover configured to traverse the transfer deck section and interface with the at least one storage section and the at least one vertical lift module; wherein one of the at least one vertical lift module, the transfer deck section, the at least one storage section, and the at least one independently operable rover form one or more of the first or second independently operable sections. In another aspect the automated storage and retrieval system further includes at least one charging section configured to interface with the at least one independently operable rover, wherein the at least one charging station forms one or more of the first or second independently operable sections. In still another aspect the automated storage and retrieval system further includes at least one palletizing section and at least one depalletizing section, wherein one or more of the at least one palletizing section and the at least one depalletizing section forms one or more of the first or second independently operable sections. In yet another aspect the at least one vertical lift module comprises two side by side vertical lifts and the transfer deck includes a rover travel aisle shared by the two side by side vertical lifts. In yet another aspect the at least one vertical lift module comprises two side by side vertical lifts and the transfer deck includes an open deck configured for unrestrained travel of rovers along the open deck for allowing rover access to the two side by side vertical lifts. In another aspect the transfer deck includes a rover travel pier extending between and shared by adjacent payload shelves of the at least one vertical lift module. In still another aspect the transfer deck includes one or more of rover travel aisles and avenues for providing access to a payload shelf of the at least one multilevel vertical conveyor section.

In accordance with one or more aspects of the disclosed embodiment one of the first or second independently operable sections includes a vertical lift having payload shelves where each payload shelf includes variably configurable payload holding locations.

In accordance with one or more aspects of the disclosed embodiment one of the first or second independently operable sections includes a vertical lift configured for both inputting and removing payload items to and from the automated storage and retrieval system.

In accordance with one or more aspects of the disclosed embodiment the automated storage and retrieval system further includes vertically stacked storage levels, where one of the first or second independently operable sections includes a vertical lift having payload shelves, the vertical lift being positioned within the automated storage and retrieval system so that each payload shelf is accessible at each storage level from opposite sides of a respective shelf.

In accordance with one or more aspects of the disclosed embodiment the automated storage and retrieval system further includes at least one vertical lift module; at least one storage section in communication with the at least one vertical lift module; and at least one independently operable rover configured to traverse the transfer deck section and interface with the at least one storage section and the at least one vertical lift module; wherein one of the at least one vertical lift module, the at least one storage section, and the at least one independently operable rover form one or more of the first or second independently operable sections.

In accordance with one or more aspects of the disclosed embodiment a method of transporting payloads in an automated storage and retrieval system includes providing a first independently operable section having a first number of predetermined storage and retrieval transactions; and providing a second independently operable section in communication with the first independently operable section and having a second number of predetermined storage and retrieval transactions; where the first and second independently operable sections provide a respective number of predetermined storage and retrieval transactions so that the first number of predetermined storage and retrieval transactions substantially matches the second number of predetermined storage and retrieval transactions.

In accordance with one or more aspects of the disclosed embodiment wherein the first number of predetermined storage and retrieval transactions comprises a vertical transaction rate and the second number of predetermined storage and retrieval transactions comprises a horizontal transaction rate. In accordance with one or more aspects of the disclosed embodiment the vertical transaction rate comprises a payload transfer rate to a predetermined vertical storage level of the automated storage and retrieval system and the horizontal transaction rate comprises one or more of a payload transfer rate of the predetermined vertical storage level and a payload transaction rate of a palletizer or depalletizer.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A method for automated storage and retrieval, the method comprising:
   providing at least one vertical lift module with a lift platform having loading access on opposite sides of the at least one vertical lift module;
   providing a transfer deck section in communication with the at least one vertical lift module, the transfer deck section including rover travel avenues and rover travel aisles substantially astride the at least one vertical lift module providing loading stations on a common level of the transfer deck section to each lift platform of the at least one vertical lift module on the opposite sides of the at least one vertical lift module;
   providing at least one storage section in communication with the transfer deck section; and
   interfacing the at least one storage section and the at least one vertical lift module with at least one independently operable rover traversing the transfer deck section.

2. The method of claim 1, further comprising providing at least one charging section for interfacing with the at least one independently operable rover.

3. The method of claim 1, further comprising providing at least one palletizing section and at least one depalletizing section.

4. The method of claim 1, further comprising providing two side by side vertical lifts and accessing the two side by side vertical lifts with each rover travel aisle.

5. The method of claim 1, further comprising extending the rover travel aisles between adjacent vertical lift modules.

6. The method of claim 1, further comprising extending the rover travel aisles between adjacent lift platforms of a common vertical lift module.

7. The method of claim 1, further comprising inputting and removing payload items to and from the automated storage and retrieval system with the vertical lift module.

8. The method of claim 1, further comprising providing vertically stacked storage levels, and positioning the vertical lift module within the automated storage and retrieval system so that each lift platform is accessible at each storage level from opposite sides of a respective platform.

9. The method of claim 1, further comprising providing two side by side vertical lifts on the at least one vertical lift module, providing an open deck configuration on the transfer deck section for unrestricted travel of rovers along the open deck, and accessing the two side by side vertical lifts with the at least one independently operable rover via the open configuration.

10. An automated storage and retrieval system comprising:
    at least one vertical lift module having lift platforms with a lift platform having loading access on opposite sides of the at least one vertical lift module;
    a transfer deck section in communication with the at least one vertical lift module;
    at least one storage section in communication with the transfer deck section; and
    at least one independently operable rover configured to traverse the transfer deck section and interface with the at least one storage section and the at least one vertical lift module;
    wherein the transfer deck section includes rover travel avenues and rover travel aisles substantially astride the at least one vertical lift module providing loading stations to the lift platforms on the opposite sides of the at least one vertical lift module on a common level of the transfer deck section to each of the lift platforms.

11. The automated storage and retrieval system of claim 10, wherein one of the at least one vertical lift module, the transfer deck section, the at least one storage section, and the at least one independently operable rover form one or more of a first or second independently operable sections.

12. The automated storage and retrieval system of claim 11, further comprising at least one charging section configured to interface with the at least one independently operable rover, wherein the at least one charging station forms one or more of the first or second independently operable sections.

13. The automated storage and retrieval system of claim 11, further comprising at least one palletizing section and at least one depalletizing section, wherein one or more of the at least one palletizing section and the at least one depalletizing section forms one or more of the first or second independently operable sections.

14. The automated storage and retrieval system of claim 10, wherein the at least one vertical lift module comprises two side by side vertical lifts and the rover travel aisles are shared by the two side by side vertical lifts.

15. The automated storage and retrieval system of claim 10, wherein the at least one vertical lift module comprises two side by side vertical lifts and the transfer deck section includes an open deck configured for unrestrained travel of rovers along the open deck for allowing rover access to the two side by side vertical lifts.

16. The automated storage and retrieval system of claim 10, wherein the rover travel aisles extend between adjacent vertical lift modules.

17. The automated storage and retrieval system of claim 10, wherein the rover travel aisles extend between adjacent lift platforms of a common vertical lift module.

18. The automated storage and retrieval system of claim 10, wherein each lift platform includes variably configurable payload holding locations.

19. The automated storage and retrieval system of claim 10, wherein the vertical lift module is configured for both inputting and removing payload items to and from the automated storage and retrieval system.

20. The automated storage and retrieval system of claim 10, further comprising vertically stacked storage levels, where the lift platforms are positioned within the automated storage and retrieval system so that each lift platform is accessible at each storage level from opposite sides of a respective lift platform.

* * * * *